United States Patent
Shi et al.

(10) Patent No.: US 12,204,879 B2
(45) Date of Patent: Jan. 21, 2025

(54) DETERMINATION OF QUANTUM CIRCUIT COMPILATION PASSES AND/OR COMPILATION PARAMETERS OPTIMIZED FOR ONE OR MORE PERFORMANCE METRICS

(71) Applicant: Amazon Technologies, Inc., Seattle, WA (US)

(72) Inventors: Yunong Shi, Stamford, CT (US); Jon-Mychael Allen Best, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 73 days.

(21) Appl. No.: 17/491,180

(22) Filed: Sep. 30, 2021

(65) Prior Publication Data

US 2023/0099621 A1     Mar. 30, 2023

(51) Int. Cl.
  *G06F 8/41*   (2018.01)
  *G06N 10/00*  (2022.01)
  *G06N 10/80*  (2022.01)

(52) U.S. Cl.
  CPC ............... *G06F 8/41* (2013.01); *G06N 10/00* (2019.01); *G06N 10/80* (2022.01)

(58) Field of Classification Search
  None
  See application file for complete search history.

(56) References Cited

U.S. PATENT DOCUMENTS

| | | | |
|---|---|---|---|
| 10,592,216 B1 * | 3/2020 | Richardson | G06F 8/443 |
| 10,657,304 B1 | 5/2020 | Itoko et al. | |
| 11,010,527 B2 | 5/2021 | Martiel et al. | |
| 11,347,490 B1 * | 5/2022 | Drepper | G06N 20/00 |
| 11,373,114 B1 * | 6/2022 | Naveh | G06N 5/01 |
| 11,386,347 B2 | 7/2022 | Low et al. | |
| 11,494,681 B1 | 11/2022 | Peterson et al. | |
| 2021/0158425 A1 | 5/2021 | Kasprowicz et al. | |
| 2021/0286601 A1 | 9/2021 | Fitzsimons et al. | |

OTHER PUBLICATIONS

Toshinari Itoko, et al. "Scheduling of Operations in Quantum Compiler," 2020 IEEE, found at arXiv:2011.04936v1 [quant-ph], pp. 1-8.
Kesha Hietala, et al., "A Verified Optimizer for Quantum Circuits," Proc. ACM Program. Lang., vol. 5, No. POPl, Article 37, Published Jan. 2021, pp. 1-29.
U.S. Appl. No. 16/698,698, filed Nov. 27, 2019, Derek Bolt.
U.S. Appl. No. 16/698,732, filed Nov. 27, 2019, Jeffrey Paul Heckey.
U.S. Appl. No. 17/393,286, filed Aug. 3, 2021, Saravanakumar Shanmugam Sakthivadivel.

(Continued)

*Primary Examiner* — Lewis A Bullock, Jr.
*Assistant Examiner* — Mark A Gooray
(74) *Attorney, Agent, or Firm* — Alexander A. Knapp; Kowert, Hood, Munyon, Rankin & Goetzel, P.C.

(57) ABSTRACT

A quantum computing service includes a quantum circuit compilation module that uses received information about quantum processing units (QPUs) along with information about a quantum circuit to be compiled in order to generate an optimized ordered list of compilation passes to be performed to compile the quantum circuit for execution on a given QPU.

20 Claims, 12 Drawing Sheets

(56) References Cited

OTHER PUBLICATIONS

U.S. Appl. No. 16/698,674, filed Nov. 27, 2019, Jeffrey Paul Heckey.
U.S. Appl. No. 16/698,737, filed Nov. 27, 2019, Christopher Kasprowicz.
International Search Report and Written Opinion mailed Jan. 2, 2023 in PCT/US2022/076828, Amazon Technologies, Inc.
Andrew W Cross et al, "OpenQASM 3: A broader and deeper quantum assembly language", arxiv.org, Apr. 30, 2021, pp. 1-54, Cornell University Library, 201 Olin Library Cornell University Ithaca, NY.
Lorenzo Moro et al, "Quantum Compiling by Deep Reinforcement Learning", arxiv.org, May 31, 2021, pp. 1-11, Cornell University Library, 201 Olin Library Cornell University Ithaca, NY.
Janusz Kusyk et al, "Survey on Quantum Circuit Compilation for Noisy Intermediate-Scale Quantum Computers: Artificial Intelligence to Heuristics", IEEE Transactions on Quantum Engineering, Mar. 23, 2021, vol. 2, pp. 1-16, IEEE.
Alexander Zlokapa et al, "A deep learning model for noise prediction on near-term quantum devices", arxiv.org, May 21, 2020, pp. 1-5, Cornell University Library, 201 Olin Library Cornell University Ithaca, NY.
Giovanni Acampora et al, "Deep neural networks for quantum circuit mapping", Neural Computing and Applications, May 9, 2021, vol. 33, No. 20, pp. 13723-13743, Springer London, London.
Gushu Li, et al., "Tackling the Qubit Mapping Problem for NISQ-Era Quantum Devices," ASPLOS'19, Apr. 13-17, 2019, Providence, RI, USA, pp. 1001-1014.
Dongmin Kim, et al., "A Parallelized Qubit Mapping Algorithm for Large-scale Quantum Circuits," IEIE Transactions on Smart Processing and Computing, vol. 11, No. 1, Feb. 2022, https://doi.org/10.5573/IEIESPC.2021.11.1.40, pp. 40-48.
Frank Leymann, et al., "The bitter truth about gate-based quantum algorithms in the NISQ era," Quantum Sci. Technol. 5 (2020) 044007, https://doi.org/10.1088/2058-9565/abae7d, pp. 1-29.
Christopher Maddison, et al., "Mastering the game of Go with deep neural networks and tree search," ResearchGate, Article in Nature, Jan. 2016, pp. 1-38.
U.S. Appl. No. 18/192,954, filed Mar. 30, 2023, Yiheng Duan, et al.
U.S. Appl. No. 18/193,294, filed Mar. 30, 2023, Yunong Shi, et al.
U.S. Appl. No. 18/065,465, filed Dec. 13, 2022, Poulami Das, et al.
U.S. Appl. No. 18/193,358, filed Mar. 30, 2023, Yunong Shi, et al.

\* cited by examiner

Layout Synthesis Compilation Passes
*(non-exhaustive examples)*
402

- Direct Layout
- Lattice Layout
- Noise Aware Layout
- Constraint Satisfaction Problem Layout
- Sabre Layout
- Generate Layout  (copies selected layout to generate the layout)
- Employ Layout    (replaces virtual qubits in generated layout with physical qubits)

Mapping Compilation Passes
*(non-exhaustive examples)*
404

- Simple Swap              (Maps quantum circuit to QPU device)
- Direct Search Swap       (Maps quantum circuit to QPU device)
- Randomized Swap          (Maps quantum circuit to QPU device)
- Sabre Swap               (Maps quantum circuit to QPU device)
- Unroller                 (Recursively unroll gates to a given basis)
- Unroll multi qubit gates (Unrolls multi-qubit gates, e.g. 3+ qubit gates)
- Decompose                (Expands gates into multiple lower level gates)
- Unroll Custom Def.       (Recursively unroll custom defined gates)
- Basic Translator         (Translate between basis)

Basis Change Passes
406

Optimization Passes
*(non-exhaustive examples)*
408

- Optimize 1-qubit gates        (Optimizes 1-qubit gates)
- Group 2-qubit gates           (Sets property of 2-qubit gates in a block-list)
- Merge Blocks                  (Merges 2-qubit blocks)
- CX Cancellation               (Cancels redundant CX gates)
- Commutation Analysis          (Sets property-set "commutation group")
- Commutation Cancelation       (Cancels gates through commutation)
- Remove Diagonal Gates Before Measure
- Remove Reset in Zero State    (Removes initial resets)
- Cross Talk Aware Schedule     (Cross talk aware scheduling)

*FIG. 4*

QPU information that is an input to the compilation module 105
(non-exhaustive examples)
502

- List of physical qubits on the QPU
- Quantum gate basis for final compiled circuit
- Coupling map that is a directed graph for the qubits and/or gates of the QPU
- Dictionary of gate error rates for the QPU
- Dictionary of known cross-talk between nearby two qubit gates for the QPU

FIG. 5

Quantum circuit information that is an input to the compilation module 105
(non-exhaustive examples)
602

- Layers included in quantum circuit
- Blocks included in quantum circuit
- Depth of the layers included in the quantum circuit

FIG. 6

Constraint information that is an input to the compilation module 105
(non-exhaustive examples)
702

- Employ layout pass requires generate layout and/or a full ancilla allocation pass to precede it
- Routing passes require generate layout passes to precede the routing passes
- Direct search swap, Sabre swap, and Randomized swap passes require an employ layout pass to precede them
- Commutation cancellation pass requires commutation analysis pass to precede it
- Merge 2-qubit blocks pass requires group 2-qubit block pass to precede it

FIG. 7

DETERMINATION OF QUANTUM CIRCUIT COMPILATION PASSES AND/OR COMPILATION PARAMETERS OPTIMIZED FOR ONE OR MORE PERFORMANCE METRICS

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects like photons, molecules, atoms, and electrons.

A quantum computer is a device that utilizes quantum physics to allow one to write, store, process and read out information encoded in quantum states, e.g., the states of quantum objects. A quantum object is a physical object that behaves according to the laws of quantum physics. The state of a physical object is a description of the object at a given time.

In quantum physics, the state of a two-level quantum system, or simply, a qubit, is a list of two complex numbers whose squares sum up to one. Each of the two numbers is called an amplitude, or quasi-probability, and their squared absolute values are probabilities that a measurement of the qubit results in zero or one. A fundamental and counterintuitive difference between a probabilistic bit (e.g., a classical zero or one bit) and the qubit is that a probabilistic bit represents a lack of information about a two-level classical system, while a qubit contains maximal information about a two-level quantum system.

Quantum computers are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum systems, such that the quantum systems are inextricably linked even if separated by great distances.

A quantum algorithm comprises a reversible transformation acting on qubits in a desired and controlled way, followed by a measurement on one or multiple qubits. For example, if a system has two qubits, a transformation may modify four numbers; with three qubits this becomes eight numbers, and so on. As such, a quantum algorithm acts on a list of numbers exponentially large as dictated by the number of qubits. To implement a transform, the transform may be decomposed into small operations acting on a single qubit, or a pair of qubits, as an example. Such small operations may be called quantum gates and a specific arrangement of the quantum gates implements a quantum circuit.

There are different types of qubits that may be used in quantum computers, each having different advantages and disadvantages. For example, some quantum computers may include qubits built from superconductors, trapped ions, semiconductors, photonics, etc. Each may experience different levels of interference, errors and decoherence. Also, some may be more useful for generating particular types of quantum circuits or quantum algorithms, while others may be more useful for generating other types of quantum circuits or quantum algorithms. Also, costs, run-times, error rates, availability, etc. may vary across quantum computing technologies.

BRIEF DESCRIPTION OF THE DRAWINGS

FIG. 4 illustrates example compilation passes that may be supported by a compilation module of a quantum computing service and from which compilation passes may be selected for inclusion in an optimized list of quantum circuit compilation passes (and/or compilation parameters) to be used to compile a given quantum circuit, according to some embodiments.

FIG. 5 illustrates example quantum processing unit (QPU) information that may be used by a compilation module of a quantum computing service to determine an optimized list of quantum circuit compilation passes (and/or compilation parameters) to be used to compile a given quantum circuit, according to some embodiments.

FIG. 6 illustrates example quantum circuit description information that may be used by a compilation module of a quantum computing service to determine an optimized list of quantum circuit compilation passes (and/or compilation parameters) to be used to compile a given quantum circuit, according to some embodiments.

FIG. 7 illustrates example compiler constraint information that may be used by a compilation module of a quantum computing service to determine an optimized list of quantum circuit compilation passes (and/or compilation parameters) to be used to compile a given quantum circuit, according to some embodiments.

Figure 1:
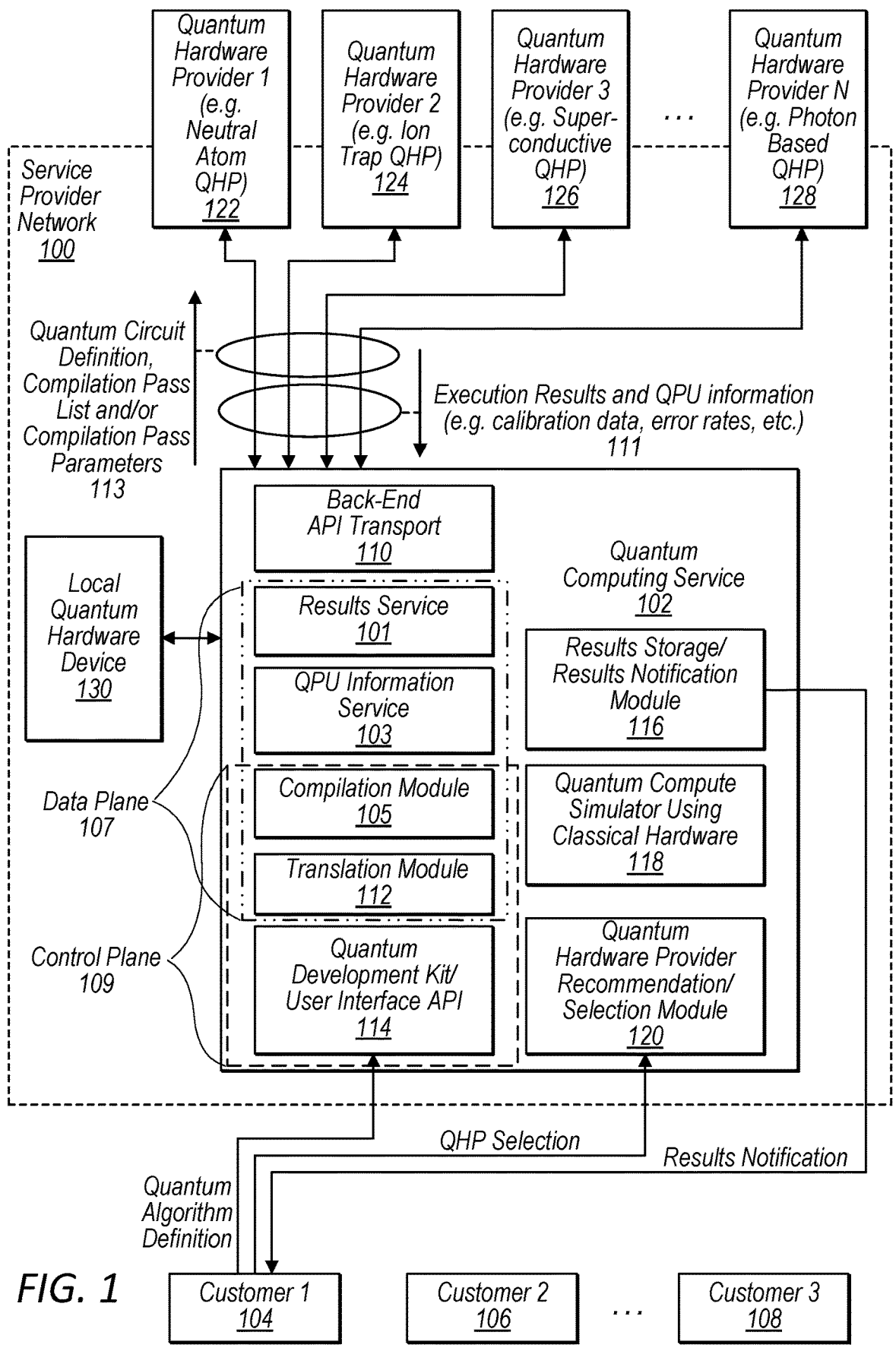
FIG. 1 illustrates a quantum computing service of a service provider network that enables customers to access quantum computers that use multiple quantum computing technologies, wherein the quantum computing service includes a quantum circuit compilation pass and/or compilation parameters determination module, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for providing quantum computing services to customers and enabling customers to seamlessly use one or more quantum computing technologies. Additionally, the disclosure relates to a compilation module of a quantum computing service that determines a list of compilation passes and/or compilation parameters to be used to compile a given quantum circuit for execution on a quantum processing unit (QPU). The determined list of compilation passes and/or compilation parameters may be determined in a way that optimizes one or more optimization metrics (M) for the quantum circuit, such as a run-time for a compiled version of the quantum circuit, a complexity of a compiled version of the quantum circuit, an error-rate for a compiled version of the quantum circuit, and/or various other optimization criteria. In some embodiments, a customer of the quantum computing service may select which optimization parameters are to be given priority when determining compilation passes and/or compilation parameters for quantum programs or quantum circuits submitted to the quantum computing service on behalf of the customer.

In some embodiments, a system includes a service provider network comprising one or more computing devices that are configured to implement a quantum computing service. The system may also include a first edge computing device of the service provider network located at a location of a first quantum hardware provider and one or more additional edge computing devices of the service provider network located at respective locations of one or more additional quantum hardware providers. In some embodiments, the quantum computing service may additionally, or alternatively, be connected to one or more quantum hardware devices located within the service provider network. For example, the quantum computing service may provide a customer access to internal quantum processing units (QPUs) and/or external quantum processing units of external quantum hardware providers (QPUs of QHPs). The one or more computing devices that implement the quantum computing service are configured to receive, from a customer of the quantum computing service, a definition of a quantum computing object to be executed and select at least one of the quantum hardware providers to execute the quantum computing object, or select an internal QPU to execute the quantum computing object. In some embodiments, the quantum computing object may be a quantum task or a quantum job, such as a task or job defined using a problem-domain interface of a quantum algorithm development kit; a quantum program defined using a quantum algorithm development kit of the quantum computing service or provided by a customer; or a quantum circuit defined using the quantum algorithm development kit of the quantum computing service, or supplied by a customer. In some embodiments, a quantum job may comprise a plurality of quantum tasks, such as quantum circuits to be executed. Also, a quantum program may include logical loops that instruct a particular quantum circuit to be implemented based on one or more conditions, such as a "for loop", "if loop", "while loop", etc. In addition, in some embodiments, a quantum program may instruct implementation of a parametric quantum circuit. In such examples as described above, execution of an individual quantum circuit of a quantum program may be referred to herein as a quantum task and execution of the quantum program as a whole may be referred to herein as a quantum job.

In some embodiments, a list of compilation passes and/or compilation parameters that may to be used to compile a quantum program and/or quantum circuit submitted to the quantum computing service may be determined based on received information about the QPU that is to be used to execute the quantum circuit or a given quantum circuit of a quantum program. Additionally, the list of compilation passes and/or the compilation parameters may be determined in a way that optimizes one or more metrics (M) for the quantum circuit or the quantum program, such as a time required to execute the quantum circuit or quantum program (e.g., run-time), a complexity of the quantum circuit (e.g. number of physical qubits and/or gates required to implement the compiled quantum circuit) or a complexity of an overall quantum program comprising multiple quantum circuits, an error-rate for the compiled quantum circuit or quantum program, etc. In some embodiments, one or more default optimization metrics (M) may be used in an optimization algorithm to determine the compilation passes and/or the compilation parameters. In some embodiments, a customer that submits a quantum circuit to a quantum computing service for execution may additionally indicate one or more optimization metrics (M) to be used to optimize compilation of the quantum circuit.

In some embodiments, a compilation module of a quantum computing service may provide a determined list of compilation passes and/or compilation parameters to a quantum hardware provider (QHP) for use in compiling a quantum circuit at the QHP for execution on a quantum processing unit (QPU) of the QHP. Also, in some embodiments, the quantum computing service may further include a compiler, such as in the compilation module, that is configured to use the determined list of compilation passes and/or the compilation parameters to generate a QPU specific compiled binary, wherein the QPU specific compiled binary is sent to a QHP for execution on a QPU of the QHP. Also, in some embodiments, a quantum computing service may include internal quantum hardware devices that include QPUs and the compiled binary may be used to locally execute the quantum circuit on a QPU of the quantum computing service.

In some embodiments, a machine learning algorithm used by a compilation module of a quantum computing service may be trained using previously compiled quantum circuits and execution performance information for the previously compiled quantum circuits in relation to the optimization metrics (M). The trained machine learning algorithm may further be used to determine optimized lists of ordered compilation passes and/or compilation parameters to be used to compile a given quantum circuit in a way that is optimized for the optimization metric (M). In some embodiments, reinforcement learning may be used to train the machine learning model. In some embodiments, a tabular learning approach may be used.

In some embodiments, the one or more computing devices that implement the quantum computing service may further be configured to provide a customer with a recommendation in regard to which quantum hardware provider or internal QPU to use to execute the customer's quantum computing object (for example to better achieve the customer's specified optimization metric (M)). In some embodiments, selection of an internal QPU of the quantum hardware provider or an external QPU of a QHP to execute the quantum computing object may be based on the recommendation generated by the quantum computing service and/or other input received from the customer regarding which type of quantum hardware to select to execute the customer's quantum computing object. In some embodiments, the recommendation may include estimated costs, error rates, run-times, etc. associated with executing the quantum computing object on quantum computers of respective ones of the quantum hardware providers or an internal QPU. In some embodiments, optimized ordered compilation passes and/or compilation parameters may be determined for a specific QPU, once a customer has selected which QHP and/or QPU is to be used to execute the customer's quantum circuit. Also, in some embodiments, optimized ordered compilation passes and/or compilation parameters may be determined for a simulation, such as simulation that simulates execution of a quantum circuit on a particular type of quantum computing device and/or a particular QPU.

The one or more computing devices implementing the quantum computing service are further configured to submit a quantum task comprising a quantum circuit to a selected one or more of the quantum hardware providers via a given edge computing device located at the respective location of the selected quantum hardware provider, receive results of executing the quantum circuit on a quantum computer of the selected quantum hardware provider, store the results of executing the quantum circuit, and provide a notification to the customer that execution of the quantum computing object has been completed. However, when an internal QPU is selected for execution of the quantum task, the quantum task may be submitted directly to a queue for the internal QPU. For example, it may not be necessary to transport the quantum task, via back-end API transport, to an edge computing device for submission of a quantum task to an internal QPU.

Note that in some embodiments, a quantum task comprising a quantum circuit may be sent to a QHP or internal QPU as a compiled binary that has been compiled using an optimized ordered list of compilation passes and/or compilation parameters as determined by the compilation module of the quantum computing service. In some embodiments, the quantum task comprising the quantum circuit may be sent to a QHP as a quantum circuit definition and accompanying ordered list of compilation passes and/or compilation parameters to be used by a compiler of the QHP to generate a compiled binary for executing the quantum circuit on a QPU of the QHP.

In some embodiments, the quantum computing service is also configured to translate a quantum computing object into a selected quantum circuit format for a particular quantum computing technology used by the selected quantum hardware provider or internal QPU, wherein the selected quantum circuit format for the particular quantum computing technology is one of a plurality of quantum circuit formats for a plurality of different quantum computing technologies supported by the quantum computing service. In some embodiments, the quantum circuit may be translated into a quantum hardware specific quantum circuit definition format prior to being provided to a compilation module in order to determine an optimized ordered list of compilation passes and/or compilation parameters for the quantum circuit.

To translate the quantum computing object into the selected quantum circuit format, the one or more computing devices that implement the quantum computing service are configured to identify portions of the quantum computing object corresponding to quantum operators in an intermediate representation in which the quantum object was submitted by the customer, substitute the quantum operators of the intermediate representation with quantum operators of the quantum circuit format of the particular quantum computing technology, and perform one or more optimizations to reduce an overall number of quantum operators in a translated quantum circuit that is a translated version of the received quantum computing object. In some embodiments, translation may be omitted or combined with compilation. Also, in some embodiments, some aspects of translation may be performed by a compiler, wherein a compilation module determines optimized list of passes that may include both translation passes and compilation passes.

Example Quantum Computing Service

Quantum computers may be difficult and costly to construct and operate. Also, there are varying quantum computing technologies under development with no clear trend as to which of the developing quantum computing technologies may gain prominence. Thus, potential users of quantum computers may be hesitant to invest in building or acquiring a particular type of quantum computer, as other quantum computing technologies may eclipse a selected quantum computing technology that a potential quantum computer user may invest in. Also, successfully using quantum computers to solve practical problems may require significant trial and error and/or otherwise require significant expertise in using quantum computers.

As an alternative to building and maintaining a quantum computer, potential users of quantum computers may instead prefer to rely on a quantum computing service to provide access to quantum computers. Also, in some embodiments, a quantum computing service, as described herein, may enable potential users of quantum computers to access quantum computers based on multiple different quantum computing technologies and/or paradigms, without the cost and resources required to build or manage such quantum computers. Also, in some embodiments, a quantum computing service, as described herein, may provide various services that simplify the experience of using a quantum computer such that potential quantum computer users lacking deep experience or knowledge of quantum mechanics, may, never the less, utilize quantum computing services to solve problems.

Also, in some embodiments, a quantum computing service, as described herein, may be used to supplement other services offered by a service provider network. For example, a quantum computing service may interact with a classical computing service to execute hybrid algorithms. In some embodiments, a quantum computing service may allow a classical computer to be accelerated by sending particular tasks to a quantum computer for execution, and then further performing additional classical compute operations using the results of the execution of a quantum computing object on the quantum computer. For example, a quantum computing service may allow for the acceleration of virtual machines implemented on classical hardware in a similar manner as a graphics processing unit (GPU) may accelerate graphical operations that otherwise would be performed on a central processing unit (CPU).

In some embodiments, a quantum computing service may provide potential quantum computer users with access to quantum computers using various quantum computing technologies, such as quantum annealers, ion trap machines, superconducting machines, photonic devices, etc. In some embodiments, a quantum computing service may provide customers with access to at least three broad categories of quantum computers including quantum annealers, circuit-based quantum computers, and analog or continuous variable quantum computers. As used herein, these three broad categories may be referred to as quantum computing paradigms.

In some embodiments, a quantum computing service may be configured to provide simulation services using classical hardware based computing instances to simulate execution of a quantum circuit on a quantum computer. In some embodiments, a quantum computing service may be configured to perform general simulation and/or simulation that specifically simulates execution of a quantum circuit on a particular type of quantum computer of a particular quantum computer technology type or paradigm type. In some embodiments, simulation may be fully managed by a quantum computing service on behalf of a customer of the quantum computing service. For example, the quantum computing service may reserve sufficient computing capacity on a virtualized computing service of the service provider network to perform simulation without customer involvement in the details of managing the resources for the simulator.

In some embodiments, a quantum computing service may include a dedicated console that provides customers access to multiple quantum computing technologies. Furthermore, the quantum computing service may provide a quantum algorithm development kit that enables customers with varying levels of familiarity with quantum circuit design to design and execute quantum circuits. In some embodiments, a console of a quantum computing service may include various application programmatic interfaces (APIs), such as:
- (Create/Delete/Update/Get/List)Simulator-Configuration—create, read, update, and delete (CRUD) operations for simulator configuration objects.
- (Start/Cancel/Describe)Simulator—used to control each of the user-defined simulator instances.
- (List/Describe) quantum processor units (QPUs)—retrieves quantum computer hardware information.
- (Create/Cancel/List/Describe) Job—used to manage the lifecycle of a quantum job.
- (Assign/Update/List) Quality of Service (QoS) guarantee—used to manage QoS guarantees for quantum jobs and/or quantum tasks.
- (Create/Cancel/List/Describe)Task—used to manage the lifecycle of individual quantum tasks/quantum objects.

In some embodiments, a quantum algorithm development kit may include a graphical user interface, APIs or other interface to allow customers of a quantum computing service to define quantum objects, such as quantum tasks, algorithms or circuits, using the quantum algorithm development kit. In the some embodiments, the quantum algorithm development kit may include an interface option that enables customers to share the quantum objects with other customers of the quantum computing service. For example, the quantum algorithm development kit may include a marketplace that allows customers to share or sell particular quantum objects with other customers. In some embodiments, the quantum algorithm development kit may include an interface element that allows customers to select a QoS to be applied for a quantum job or quantum tasks defined via the quantum algorithm development kit.

In some embodiments, a quantum computing service may include a public application programmatic interface (API) that accepts quantum objects submitted by a customer of the quantum computing service. Additionally, the quantum computing service may include a back-end API transport that is non-public. The back-end API transport may enable quantum circuits to be transported from a centralized location that implements the quantum computing service, such as one or more data centers of a service provider network, to an edge computing device at a particular quantum hardware provider location where the quantum circuit is to be executed. In some embodiments, quantum objects or quantum tasks may be executed using an internal QPU of the quantum computing service without using a back-end API transport to transport the quantum job or quantum task to an external quantum hardware provider location.

In some embodiments, results of the execution of a quantum circuit on a quantum computer at a quantum hardware provider location may be provided to the edge computing device at the quantum hardware provider location. The edge computing device may automatically transport the results to a secure storage service of the service provider network, where the customer can access the results using the storage service of the service provider network or via a console of the quantum computing service. Likewise, results of execution of a quantum circuit via an internal QPU may be accessed via the console of the quantum computing service.

In some embodiments, the results stored to the secure storage service may be seamlessly used by other services integrated into the service provider network, such as a machine learning service, a database service, an object-based storage service, a block-storage service, a data presentation service (that reformats the results into a more usable configuration), etc. For example, in some embodiments, a machine learning service may be used to optimize a quantum algorithm or quantum circuit. For example, the machine learning service may cause various versions of a quantum algorithm or quantum circuit to be run on a quantum computer via a quantum computing service. The machine learning service may also be provided access to results of running the quantum algorithms or quantum circuits. In some embodiments, the machine learning service may cause the quantum algorithms or quantum circuits to be run on various different quantum computing technology based quantum computers. Based on the results, the machine learning service may determine one or more optimizations to improve the quantum algorithms or quantum circuits.

In some embodiments, a quantum computing service may support creating snapshots of results of executing a quantum circuit. For example, the quantum computing service may store snapshots of intermediate results of a hybrid algorithm or may more generally store snapshots of any results generated by executing a quantum circuit on a quantum computer. In some embodiments, an edge computing device at a hardware provider location may temporarily store results and may create snapshot copies of results stored on the edge computing device. The edge computing device may further cause the snapshot copies to be stored in an object-based data storage service of the service provider network. In some embodiments, snapshotting may not be performed, based on customer preferences.

FIG. 1 illustrates a quantum computing service of a service provider network that enables customers to access quantum computers that use multiple quantum computing technologies, wherein the quantum computing service includes a compilation module, according to some embodiments.

Service provider network 100 includes quantum computing service 102. In some embodiments, service provider network 100 may include data centers, routers, networking devices, etc., such as of a cloud computing provider network. In some embodiments, customers 104, 106, and 108 and/or additional customers of service provider network 100 and/or quantum computing service 102, may be connected to the service provider network 100 in various ways, such as via a logically isolated connection over a public network, via a dedicated private physical connection, not accessible to the public, via a public Internet connection, etc.

Also, quantum computing service 102 is connected to quantum hardware providers 122, 124, 126, and 128. In some embodiments, quantum hardware providers 122, 124, 126, and 128 may offer access to run quantum programs and/or quantum circuits on quantum computers that operate based on various different types of quantum computing technologies or paradigms, such as based on neutral atom, ion-trap, superconductive materials, photons, etc.

Figure 12:
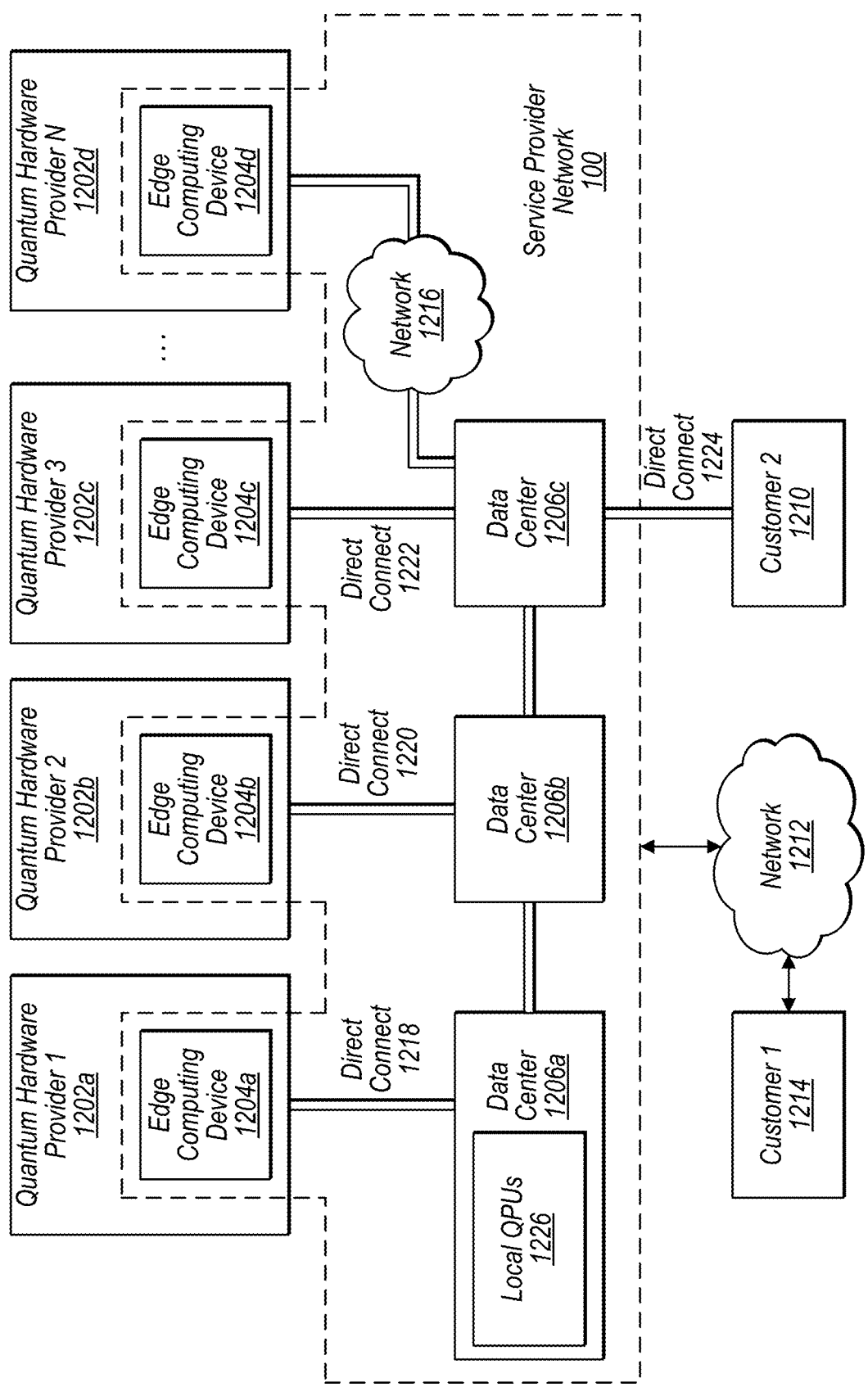
FIG. 12 illustrates edge computing devices of a quantum computing service physically located at quantum hardware provider locations, according to some embodiments.

As discussed in more detail in FIG. 12, in some embodiments, a service provider network 100 may be extended to include one or more edge computing devices physically located at quantum hardware provider locations, such as in a facility of quantum hardware providers 122, 124, 126, and 128. Physically locating an edge computing device of a service provider network 100 on premises at a quantum hardware provider facility may extend data security and encryption of the service provider network 100 into the quantum hardware providers 122, 124, 126, and 128 facilities, thus ensuring the security of customer data. Also, physically locating an edge computing device of a service provider network 100 on premises at a quantum hardware provider facility may reduce latency between a compute instance of the service provider network and a quantum computer located at the quantum hardware provider facility. Thus, some applications, such as hybrid algorithms that are sensitive to network latencies may be performed by quantum computing service 102, whereas other systems without co-located classical compute capacity at a hardware provider location may have too high of latencies to perform such hybrid algorithms efficiently.

In some embodiments, quantum computing service 102 includes one or more back-end API transport modules 110. In some embodiments, a back-end API transport module 110 may be primarily implemented on edge computing devices of the quantum computing service that are located at the quantum hardware provider locations (such as edge computing devices 1204a, 1204b, 1204c, and 1204d illustrated in FIG. 12). Also, in some embodiments, at least some of the back-end API transport functionality may be implemented on the one or more computing devices of the service provider network that implement the quantum computing service (such as computing devices in data center 1206a, 1206b, 1206c illustrated in FIG. 12).

Quantum programs and/or quantum circuits that have been translated by translation module 112 may be provided to back-end API transport module 110 in order for the translated quantum circuits to be transported to a quantum computer at a respective quantum hardware provider location. In some embodiments, the translated quantum programs and/or quantum circuits may further be compiled and sent as a compiled binary via the back-end API transport, or may be sent via the back-end API transport with accompanying compilation metadata indicating an ordered list of compilation passes to be used to compile the quantum programs and/or quantum circuits and indicating compilation parameters to be used in the respective compilation passes. For ease of explanation, the following discussion refers to quantum circuits, but the techniques described may equally be applied to quantum programs comprising one or more quantum circuits. Also, in some embodiments, a compilation module may further determine optimized compilation passes and/or compilation parameters for classical compute portions of quantum programs, wherein the quantum programs include a classical computing portion and quantum computing portion.

In some embodiments, back-end API transport 110 may be a non-public API that is accessible by an edge computing device of service provider network 100, but that is not publicly available. In some embodiments, edge computing devices at the quantum hardware providers 122, 124, 126, and 128 may periodically ping a quantum computing service side interface to the back-end API transport 110 to determine if there are any quantum circuits (or batches of quantum circuits) waiting to be transported to the edge computing device. If so, the edge computing device may perform an API call to the back-end API transport 110 to cause the quantum circuit to be transported over a private connection to the edge computing device and scheduled for execution on a quantum computer. As discussed herein, in some embodiments, the quantum circuits may be transported with accompanying metadata indicating an optimized list of compilation passes and/or compilation parameters to be used to compile the quantum circuit for execution on a particular QPU. Also, the edge computing device may have been configured with a quantum machine image that enables the edge computing device to interface with a scheduling application of the quantum hardware provider, where the edge computing device is located, in order to schedule a time slot on the quantum computer of the quantum hardware provider to execute the quantum circuit via the back-end API transport 110.

In some embodiments, a quantum computing service 102 may include, a quantum algorithm development kit 114 and/or user interface application programmatic interface (API) 114, a translation module 112, and a quantum compute simulator using classical hardware 118. Additionally, a data plane 107 of the quantum computing service 102 may include a results service 101 that receives execution performance results for previously compiled quantum circuits that were executed on particular QPUs of QHPs or executed on a particular local QPU. Additionally, the data plane 107 may include a QPU information service that receives information about QPUs at QHPs that are to be used to execute quantum circuits. For example, calibration information and/or other QPU specific information 111 may be provided from QHPs 122, 124, 126, or 128, via back-end API transport 110 to QPU information service 103, wherein the QPU specific information 111 comprises information about particular QPUs of the QHPs. A control plane for the quantum computing service 102 may include a quantum development kit and/or user interface application programmatic interface (API) 114, a translation module 112, and a compilation module 105. The compilation module 105 may use QPU information from the QPU information service 103 and execution results information from the results service 101 to determine optimized lists of compilation passes for compiling quantum circuits received or designed via quantum development kit and/or user interface API 114. As mentioned above, in some embodiments, the compilation module may provide the optimized ordered list of compilation passes to a QHP for use in performing compilation at the QHP as shown via compilation pass list and or compilation pass parameters 113. Also, in some embodiments, the compilation module may include a compiler and may use the optimized ordered list of compilation passes to locally compile a compiled binary for the quantum circuit and may provide the compiled binary to a QHP.

In some embodiments, results of executing the quantum circuit on the quantum computer at the quantum hardware provider location may be returned to the edge computing device at the quantum hardware provider location. The edge computing device and/or quantum computing service 102 may cause the results to be stored in a data storage system of the service provider network 100. In some embodiments, results storage/results notification module 116 may coordinate storing results and may notify a customer, such as customer 104, that the results are ready from the execution of the customer's quantum object, such as a quantum task, quantum algorithm, or quantum circuit. In some embodiments, results storage/results notification module 116 may cause storage space in a data storage service to be allocated to a customer to store the customer's results. Also, the results storage/results notification module 116 may specify access restrictions for viewing the customer's results in accordance with customer preferences.

In some embodiments, quantum compute simulator using classical hardware 118 of quantum computing service 102, may be used to simulate a quantum algorithm or quantum circuit using classical hardware. For example, one or more virtual machines of a virtual computing service may be instantiated to process a quantum program or quantum circuit simulation job. In some embodiments, quantum compute simulator using classical hardware 118 may fully manage compute instances that perform quantum circuit or quantum program simulation. For example, in some embodiments, a customer may submit a quantum circuit or quantum program to be simulated and quantum compute simulator using classical hardware 118 may determine resources needed to perform the simulation job, reserve the resources, configure the resources, etc. In some embodiments, quantum compute simulator using classical hardware 118 may include one or more "warm" simulators that are pre-configured simulators such that they are ready to perform a simulation job without a delay typically involved in reserving resources and configuring the resources to perform simulation.

In some embodiments, quantum computing service 102 includes quantum hardware provider recommendation/selection module 120. In some embodiments, quantum hardware recommendation/selection module 120 may make a recommendation to a quantum computing service customer as to which type of quantum computer or which quantum hardware provider to use to execute a quantum object submitted by the customer. Additionally, or alternatively, the quantum hardware provider recommendation/selection module 120 may receive a customer selection of a quantum computer type and/or quantum hardware provider to use to execute the customer's quantum object, such as a quantum task, quantum algorithm, quantum circuit, etc. submitted by the customer or otherwise defined with customer input.

In some embodiments, a recommendation provided by quantum hardware provider recommendation/selection module 120 may be based on one or more characteristics of a quantum object submitted by a customer and one or more characteristics of the quantum hardware providers supported by the quantum computing service 102, such as one or more of quantum hardware providers 122, 124, 126, or 128.

In some embodiments, quantum hardware provider recommendation/selection module may make a recommendation based on known data about previously executed quantum objects similar to the quantum object submitted by the customer. For example, quantum computing service 102 may store certain amounts of metadata about executed quantum objects and use such metadata to make recommendations. In some embodiments, a recommendation may include an estimated cost to perform the quantum computing task by each of the first and second quantum hardware providers. In some embodiments, a recommendation may include an estimated error rate for each of the first and second quantum hardware providers in regard to performing the quantum computing task. In some embodiments, a recommendation may include an estimated length of time to execute the quantum computing task for each of the first and second quantum hardware providers. In some embodiments, a recommendation may include various other types of information relating to one or more quantum hardware providers or any combination of the above.

In some embodiments, quantum compute simulator using classical hardware 118, may allow a customer to simulate one or more particular quantum computing technology environments. For example, a customer may simulate a quantum circuit in an annealing quantum computing environment and an ion trap quantum computing environment to determine simulated error rates. The customer may then use this information to make a selection of a quantum hardware provider to use to execute the customer's quantum circuit.

Figure 2A:
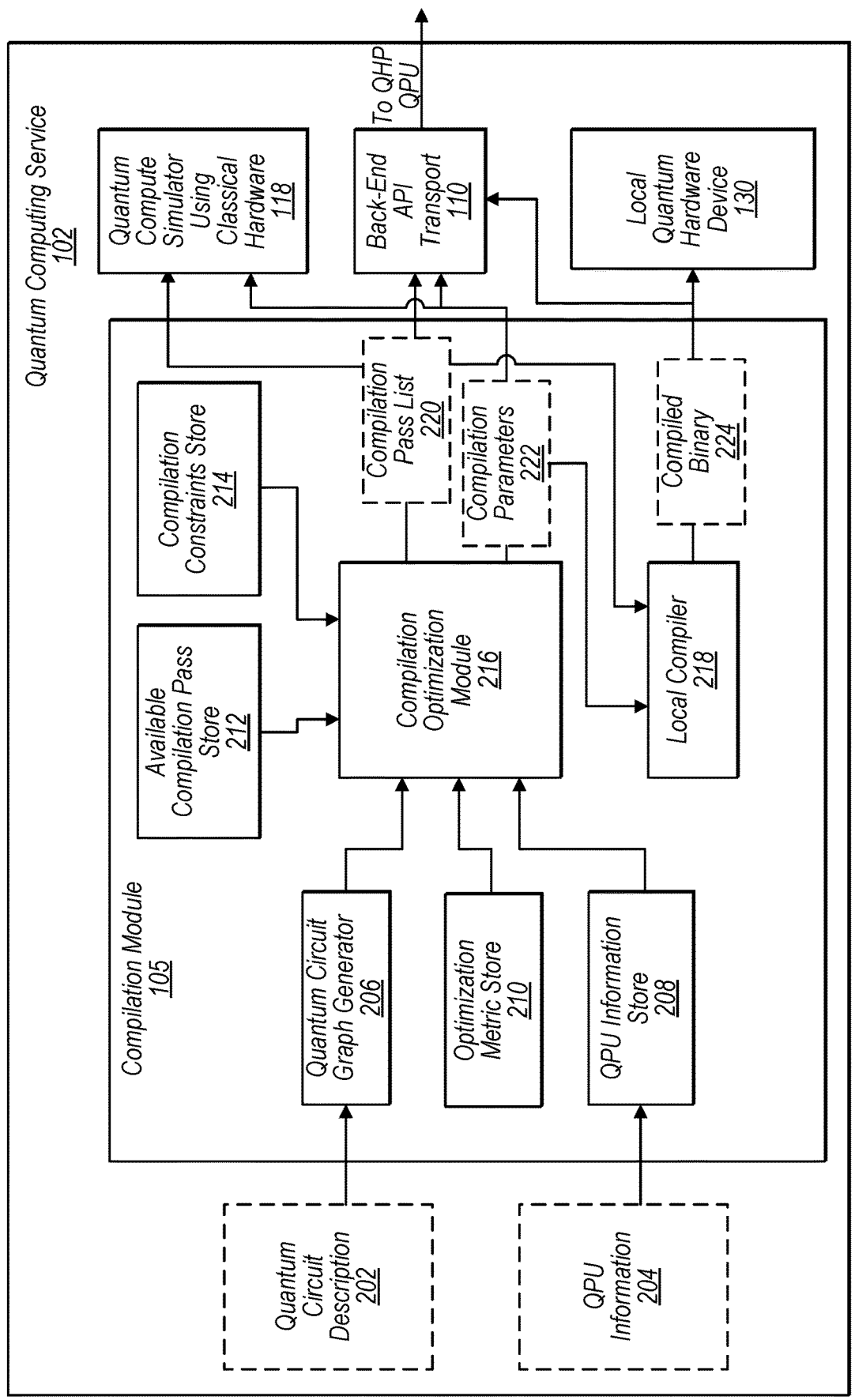
FIG. 2A illustrates a more detailed view of a quantum circuit compilation pass and/or compilation parameters determination module, according to some embodiments.

FIG. 2A illustrates a more detailed view of a quantum circuit compilation pass and/or compilation parameters determination module, according to some embodiments.

Figure 3:
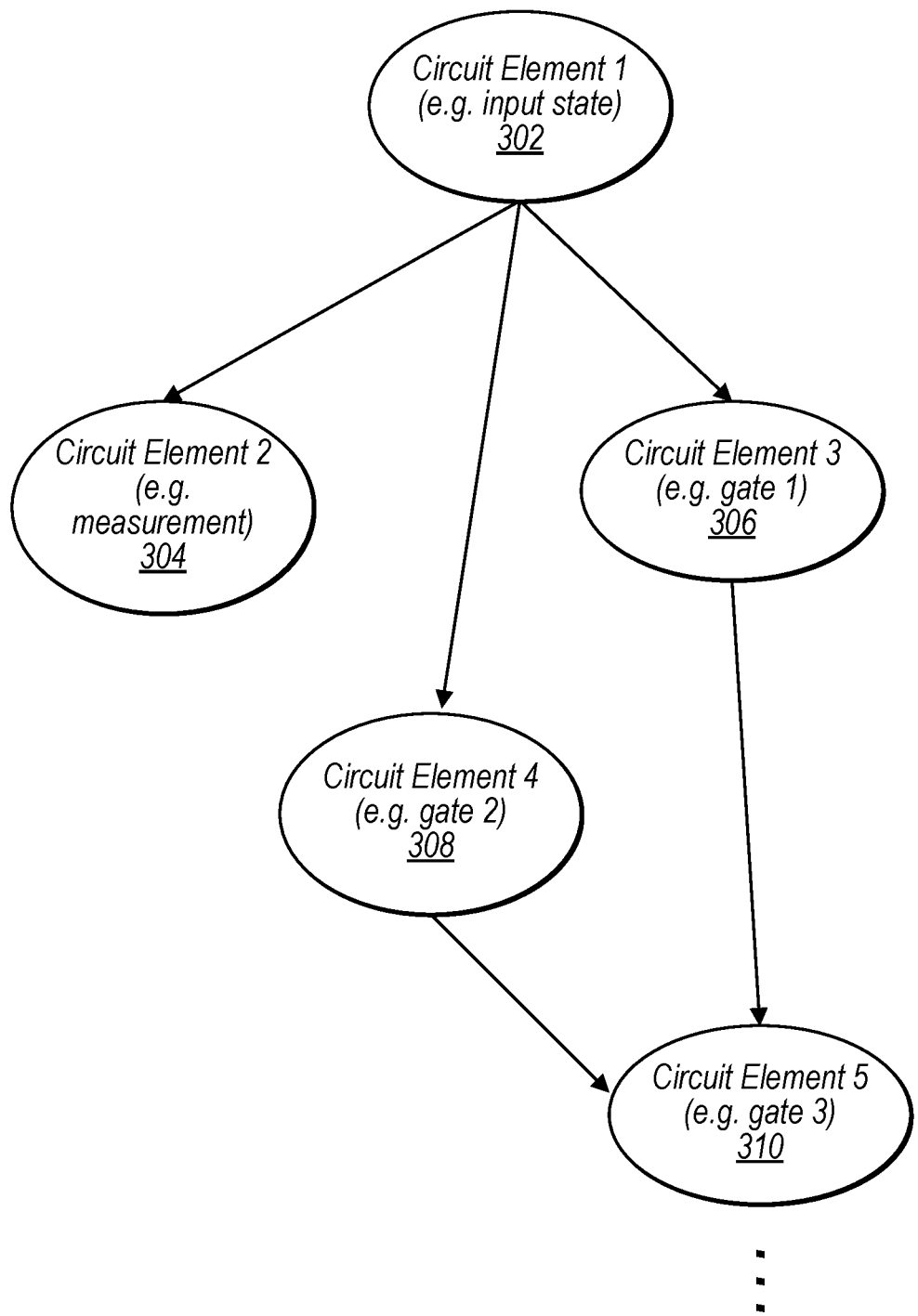
FIG. 3 illustrates an example directed acyclic graph that may be used to represent a quantum circuit, according to some embodiments.

Compilation module 105, which may be the same or similar to compilation module 105 shown in FIG. 1, includes a quantum circuit graph generator 206, that may generate a graphical representation of a quantum circuit, such as a directed acyclic graph of an input quantum circuit description 202. The compilation module 105 also includes an optimization metric store 210 that stores information indicating what optimization metric(s) (M) are to be used to optimize compilation passes and/or compilation parameters for the quantum circuit 202. In some embodiments, the quantum circuit description 202 may include quantum circuit information, such as shown in FIG. 6, or the quantum circuit graph generator 206, may generate a graph such as shown in FIG. 3 and additionally generate quantum circuit information as shown in FIG. 6. Note that in some embodiments, different optimization metrics (M) may be used for different customers and/or different quantum programs or quantum circuits submitted by a same customer. Additionally, compilation module 105 includes QPU information store 208 which stores QPU information received from a QHP via a back-end API transport, such as back-end API transport 110. In some embodiments, the QPU information store 208 may also store QPU information for local QPUs of the quantum computing service 102, such as local QPUs 1226 shown in FIG. 12. In some embodiment, the QPU information store 208 stores QPU information, such as shown in FIG. 5, for QPUs that are to be used to execute quantum circuits submitted by customers of quantum computing service 102. Additionally, available compilation pass store 212, stores available compilation passes, such as those shown in FIG. 4. Also, compilation constraints store 214 stores known constraints that must be enforced when compiling a given quantum program or a given quantum circuit, such as those shown in FIG. 7. Note, that the compilation passes shown in FIG. 4, the QPU information shown in FIG. 5, the quantum circuit information shown in FIG. 6, and the constraints shown in FIG. 7 are provided as example types of inputs that compilation optimization module 216 may use to determine an optimized ordered list of compilation passes and/or compilation parameters to be used to compile a particular quantum circuit for execution on a particular QPU. However, these examples are not intended to be exhaustive, such that other compilation passes, types QPU information, constraints, quantum circuit descriptions, etc. may be used by compilation optimization module 216 in order to determine an optimized ordered list of compilation passes and/or compilation parameters to be used to compile a particular quantum circuit for execution on a particular QPU.

The compilation optimization module 216 uses the quantum circuit graph from quantum circuit graph generator 206 and/or accompanying quantum circuit information along with QPU information from QPU information store 208, and an optimization metric from optimization metric store 210 to determine an optimized list of compilation passes and/or compilation parameters to be used to compile quantum circuit 202. The optimization may use any of the supported quantum passes stored in available compilation pass store 212 and may enforce the constraints included in compilation constraints store 214. The output of the compilation optimization module 216 may be compilation pass list 220 and compilation parameters 222, which may be provided to back-end API transport 110 for transport to a compiler of a QHP, or may be provided to local compiler 218 of quantum computing service 102. In the latter case, a compiled binary 224 may be provided to the back-end API transport for transport to a QHP or may be provided to local quantum hardware device 130 of quantum computing service 102. In some embodiments, the compilation pass list 220 and compilation parameters 222 may be provided to a simulator, such as quantum compute simulator using classical hardware 118, for use in simulating execution of a particular quantum circuit on a particular type of QPU and/or a specific QPU.

In some embodiments, the quantum circuit description provided to the compilation optimization module 216 from quantum circuit graph generator 206 may be a directed acyclic graph (DAG) and an accompanying property set dictionary for the quantum circuit, such as quantum circuit property set dictionary 602 shown in FIG. 6. As shown in FIG. 6, the property set dictionary for the quantum circuit may indicate circuit statistics, such as layers, blocks (e.g., quantum circuit blocks of a quantum program), depth, and other information, such as an initial layout for the quantum circuit or quantum program.

In some embodiments, the QPU information may include a description of a particular quantum hardware device that is to be used to execute a particular quantum circuit. For example, FIG. 5 illustrates an example quantum hardware description 502. In some embodiments, such a quantum hardware description may include:
  a list of physical qubits of the quantum hardware device;
  a quantum gate basis for a final output circuit to be implemented on the quantum hardware device;
  a coupling map, such as a directed graph;
  a dictionary of gate error rates for gates implemented using the quantum hardware device;
  a dictionary of cross-talk error rates for cross-talk between nearby two-qubit gates of the quantum hardware device; or
  other relevant information describing performance of the quantum hardware device.

In some embodiments, available compiler (which may also be referred to in some situations as a transpiler) passes may include layout synthesis passes 402, mapping compilation passes 404, basis change passes 406 and optimization passes 408. FIG. 4 lists examples of these types of compiler passes, though in some embodiments other passes may be supported. In some embodiments, two broad types of passes may be used: 1) transformational passes that make changes to the graphical representation of the quantum circuit being compiled (e.g., the DAG); and 2) analysis passes that make changes to the property set dictionary for the quantum circuit being compiled.

In some embodiments, constraints may include constraints that require at least some compilation passes to be performed in order to generate a compiled version of the quantum circuit that is executable on the particular QPU and other constraints that affect an order in which compiler passes are performed. For example, some compiler passes may require other compiler passes to have already been performed before the compiler passes can be performed. The first type of constraint may be referred to as an existence constraint, for example in order for a quantum circuit to be executed on a particular QPU the gates may have to be unrolled into gates that are physically executable on the particular QPU (e.g., higher level gates that do not correspond to physical gates of the QPU must be replaced with the physical gates actually supported by the QPU). Thus, in order for a quantum circuit to be executed on the particular QPU, an unroll higher level gates pass may be required to have been performed.

The determined compilation pass list 220 may satisfy the constraints for the particular QPU and include an optimized list of compilation passes. For example, the ordered list of compilation passes included in pass list 220 may ensure that a compiled binary for the quantum circuit is unrolled to a given basis of the QPU, mapped such that input hardware is mapped via a coupling map, and that the compilation passes are optimized with respect to optimization metric (M).

In some embodiments, compilation optimization module 216 may use a tabular learning approach, which comprises a search algorithm for problems in which the state-action space is small enough to fit in a table. The search may use flags to ensure existence and dependency constraints are satisfied. Example flags that may be associated with the quantum circuit during or subsequent to particular ones of the compilation passes may include:

A multi-qubit unrolling flag. The multi-qubit unrolling flag may indicate whether or not multi-qubit gates have been un-rolled into lower-level gates in a given compilation pass.

A custom definition unrolling flag. The custom definition unrolling flag may indicate whether or not custom definitions have been unrolled in a given compilation pass.

A layout selection flag. The layout selection flag may be formatted as a tuple (e.g. [$\text{flag}_{layout\ selection}$, $\text{flag}_{physical\ qubit}$, $D_{layout}$}). If the $\text{flag}_{layout\ selection}$ is set to equal 3, it means that all qubits are fully mapped and ancilla is fully mapped. If the $\text{flag}_{layout\ selection}$ is set to equal 2, it means qubits fully mapped. If the $\text{flag}_{layout\ selection}$ is set to equal 1, it means that qubits are partially mapped. If the $\text{flag}_{layout\ selection}$ is set to equal 0, it means unmapped. If the $\text{flag}_{physical\ qubit}$ flag is set, it indicates that all qubit names in the circuit (at the end of a given compilation pass with which the flag is associated) are physical qubit names. If the $D_{layout}$ flag is set, it means that the layout dictionary is updated for the currently mapped qubits.

A routing flag. The routing flag also uses a tuple (e.g. [$\text{flag}_{routing}$, $D_{routing}$}). If the $\text{flag}_{routing}$ is set to equal 2, it means all two-qubit gates are fully mapped. If the $\text{flag}_{routing}$ is set to equal 1, it means that two-qubit gates are partially mapped. If the $\text{flag}_{routing}$ is set to equal 0, it means the two-qubit gates are unmapped. $D_{routing}$ is the current layer number before which all two-qubit gates are mapped.

Unrolling flag. The unrolling flag indicates whether or not the gates have been unrolled to the given basis of the QPU.

In some embodiments, as part of performing compilation, the flags are updated and/or verified via analysis compilation passes. For example, a "check map" analysis pass may verify that the routing flag is set to equal 1. In some embodiments, a general state of the quantum circuit subsequent to each compilation pass may be defined using the graphical representation of the quantum circuit (which may be modified by a given compilation pass), the dictionary properties of the quantum circuit (which may be modified by a given compilation pass), the current pass number (in the ordered list of compilation passes), and the state of the above flags for the quantum circuit (e.g. state of the multi-qubit unrolling flag, state of the custom definition unrolling flag, state of the layout selection flag, state of the routing flag, state of the unrolling flag). In some embodiments, the flags may be used to ensure a valid output state. For example, flags corresponding to existence constraints may be verified to be set before determining an optimized list of compilation passes is a valid list that will result in a valid compiled quantum circuit.

Figure 2B:
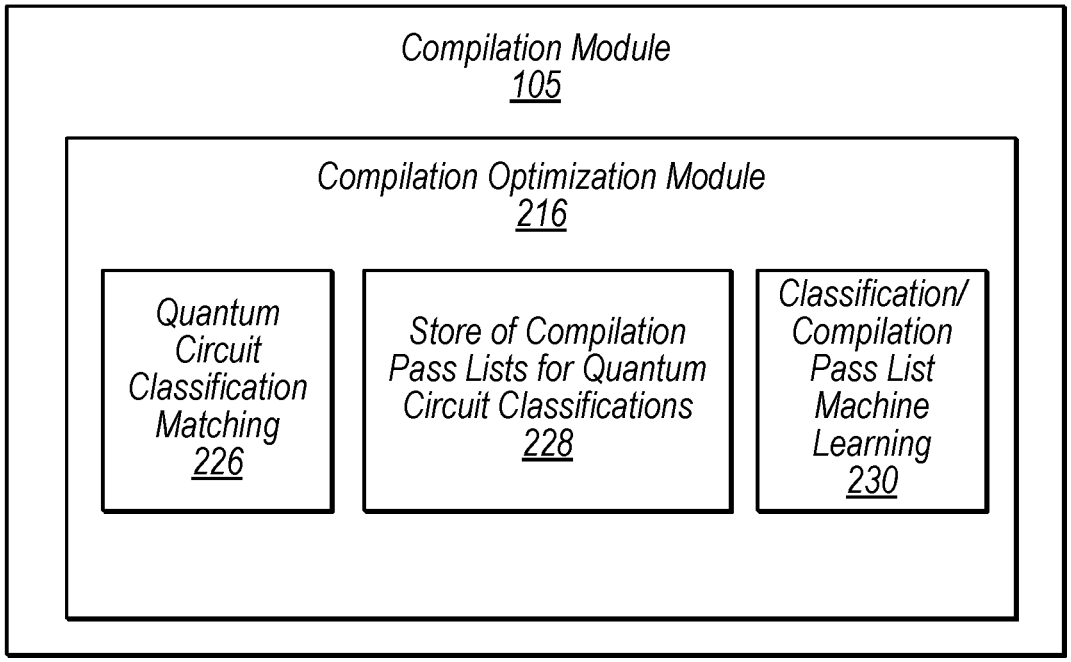
FIG. 2B illustrates a more detailed view of an example compilation optimization module of a quantum circuit compilation pass and/or compilation parameters determination module, according to some embodiments.

FIG. 2B illustrates a more detailed view of an example compilation optimization module of a quantum circuit compilation pass and/or compilation parameters determination module, according to some embodiments.

In some embodiments, compilation optimization module 216 includes a quantum circuit classification matching module 226 that associates a received quantum circuit with one of a plurality of pre-defined quantum circuit classifications. Each quantum circuit classification may have an associated ordered compilation pass list and/or compilation parameters, which may be stored in store 228. The compilation optimization module 216 may return the appropriate ordered compilation pass list and/or compilation parameters corresponding to the quantum circuit classification determined by the quantum circuit classification matching module 226 for a given quantum circuit. In some embodiments, compilation optimization module 216 further includes classification and compilation pass list machine learning module 230, which may learn new classifications and associated compilation pass lists and associated compilation parameters. Additionally, classification and compilation pass list machine learning module 230 may update existing classifications and associated compilation pass lists and associated compilation parameters.

Figure 2C:
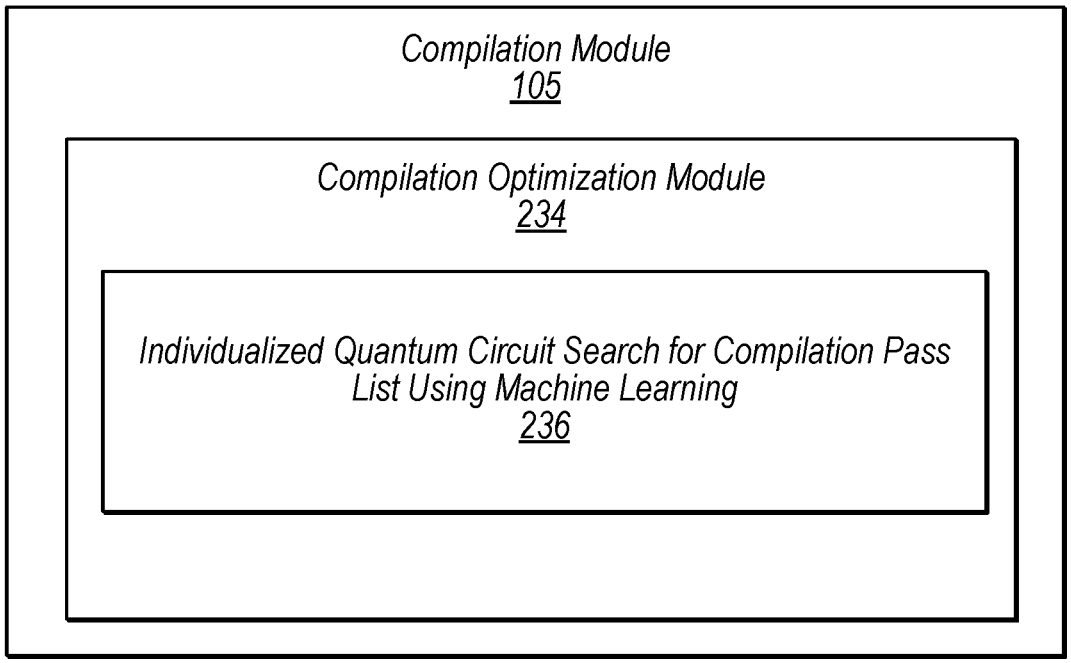
FIG. 2C illustrates a more detailed view of another example compilation optimization module of a quantum circuit compilation pass and/or compilation parameters determination module, according to some embodiments.

FIG. 2C illustrates a more detailed view of another example compilation optimization module of a quantum circuit compilation pass and/or compilation parameters determination module, according to some embodiments.

In some embodiments, a compilation module 105 as shown in FIG. 2B may additionally or alternatively include a compilation optimization module 234 that includes an individualized quantum circuit search for compilation pass list and/or compilation pass parameters using machine learning module. Instead of employing a search for a general quantum circuit classification as described for compilation optimization module 216, the machine learning algorithm may perform a search for the individual quantum circuit that is to be compiled.

Figure 2D:
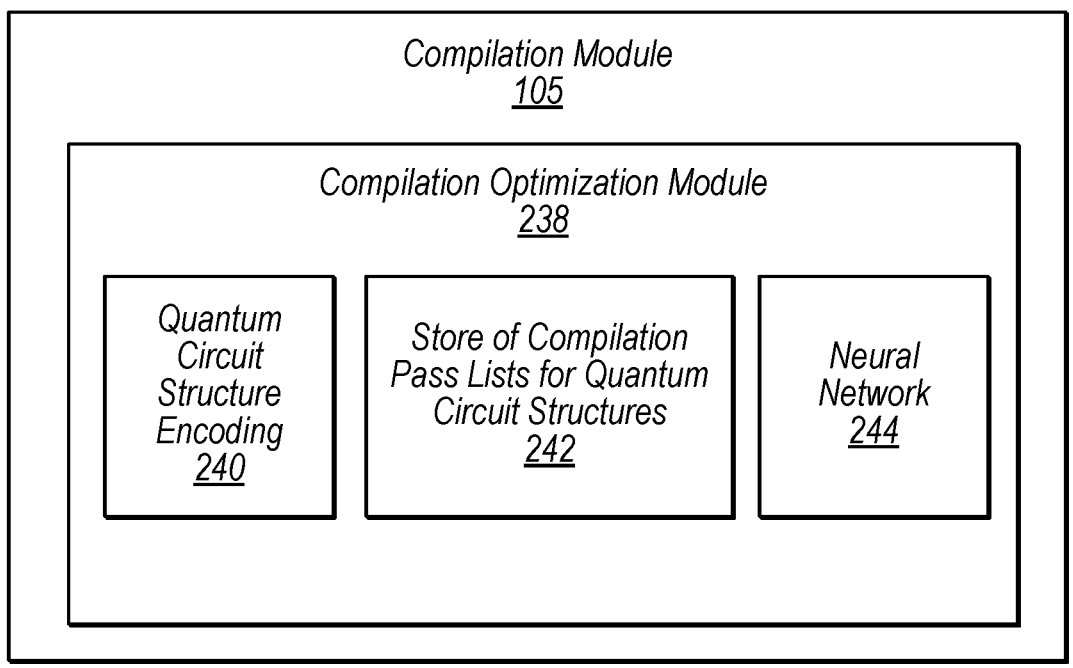
FIG. 2D illustrates a more detailed view of yet another example compilation optimization module of a quantum circuit compilation pass and/or compilation parameters determination module, according to some embodiments.

FIG. 2D illustrates a more detailed view of yet another an example compilation optimization module of a quantum circuit compilation pass and/or compilation parameters determination module, according to some embodiments.

In some embodiments, a compilation module 105 as shown in FIG. 2B or 2C may additionally, or alternatively, include a compilation optimization module 238 that includes a quantum circuit structure encoding module 240, which determines a graphical representation of the quantum circuit, such as the directed acyclic graph shown in FIG. 3. Also, compilation optimization module 238 includes a store of compilation passes and/or compilation parameters that have been used for quantum circuits having particular quantum circuit structures as represented in a graphical representation. Additionally, compilation optimization module 238 includes a neural network that is configured to generate compilation pass lists and/or compilation parameters based on learned relationships for the quantum circuit structures stored in 242 and a given quantum circuit structure as represented by a graphical representation of a quantum circuit generated by quantum circuit structure encoding 240.

As discussed above, FIG. 3 illustrates an example directed acyclic graph that may be used to represent a quantum circuit, according to some embodiments. For example, a quantum circuit received from a customer may be formatted as a text definition, a circuit diagram, or may be formatted in various other formats. The received quantum circuit may be re-formatted into a directed acyclic graph, such as shown in FIG. 3. For example, an input quantum circuit comprising an input state 302, measurement step 304, and gates 306, 308, and 310, may be represented as a directed acyclic graph (DAG) as shown in FIG. 3.

Figure 8:
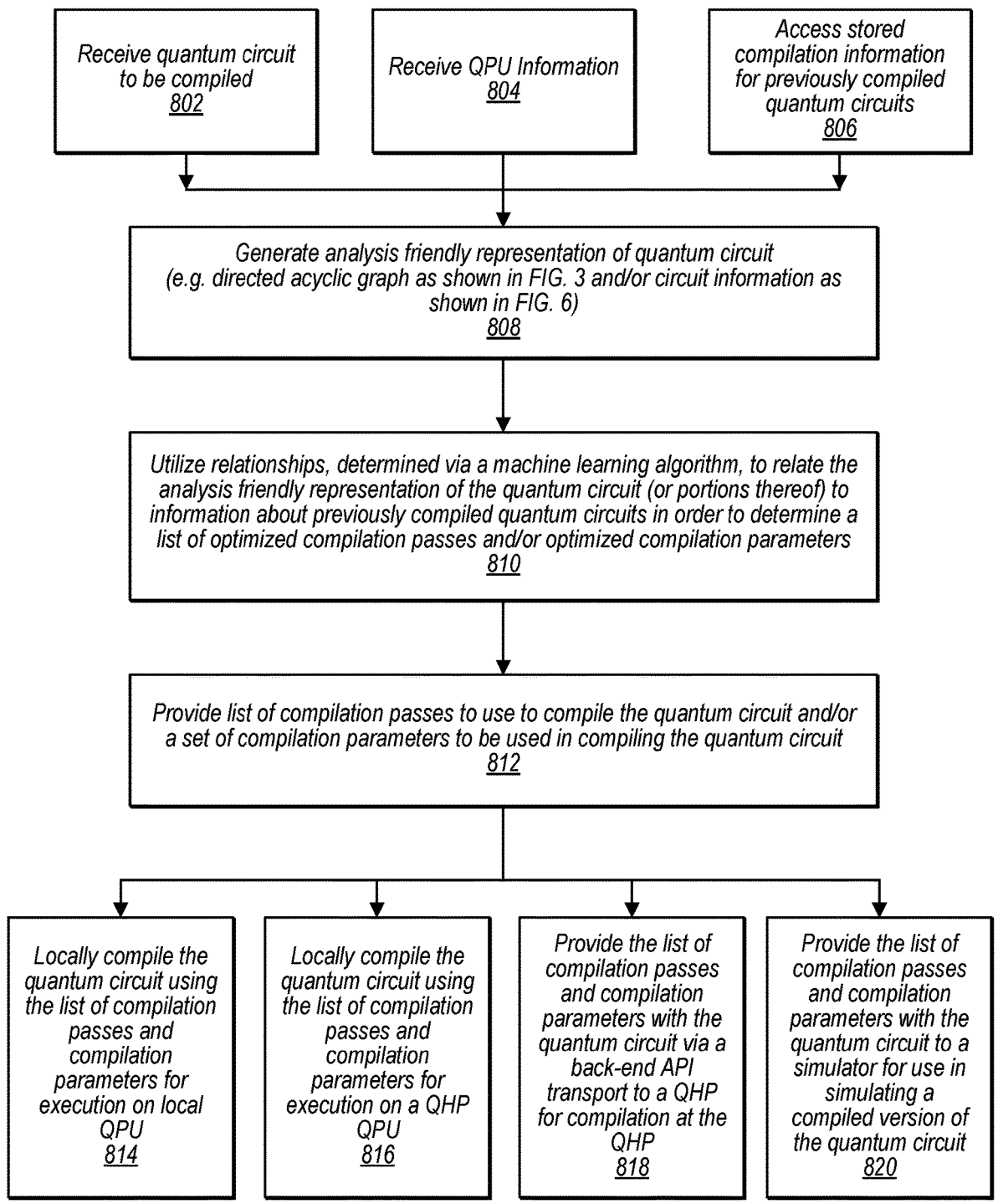
FIG. 8 illustrates an example process that may be followed by a compilation module of a quantum computing service to determine an optimized list of quantum circuit compilation passes (and/or compilation parameters) to be used to compile a given quantum circuit, according to some embodiments.

FIG. 8 illustrates an example process that may be followed by a compilation module of a quantum computing service to determine an optimized list of quantum circuit compilation passes to be used to compile a given quantum circuit, according to some embodiments.

At block 802, a quantum computing service receives a quantum circuit to be compiled. At block 804, the quantum computing service receives or obtains QPU information for QPUs that are to be use to execute quantum circuits, such as the quantum circuit received at 802. At block 806, a machine learning algorithm used by the quantum computing service accesses stored compilation information for previously compiled quantum circuits, such as quantum pass lists and/or compilation parameters used for the previously compiled quantum circuits, along descriptive information for the previously compiled quantum circuits, such as DAGs for the previously compiled quantum circuits and/or property set dictionaries for the previously compiled quantum circuits, such as is included in quantum circuit information 602 of FIG. 6. Also, the stored compilation information may include performance information for the previously compiled quantum circuits, such as run-times, complexity (number of qubits and/or gates used to implement the previously compiled quantum circuits), error rates, etc. The data accessed at block 806 may function as training data for training a machine learning algorithm 230, 236, or a neural network 244 as described in FIGS. 2B-2D.

In some embodiments, at block 808, a compilation module of the quantum computing service generates an analysis friendly representation of quantum circuit (e.g., directed acyclic graph as shown in FIG. 3 and/or circuit information as shown in FIG. 6). At block 810, a compilation optimization module of the compilation module utilizes relationships determined via a machine learning algorithm to relate the analysis friendly representation of the quantum circuit (or portions thereof) to information about previously compiled quantum circuits in order to determine a list of optimized compilation passes and/or optimized compilation parameters. At block 812, the compilation module provides an ordered list of compilation passes to be used to compile a compiled binary executable on a particular QPU for the quantum circuit. The compilation module may also provide a set of compilation parameters to be used in the compilation passes.

At blocks 814, 816, 818, and 820 the provided list of compilation passes and/or compilation parameters is used to compiled a compiled binary for the quantum circuit and/or simulate the quantum circuit. The provided list of compilation passes and/or compilation parameters may be used by a QHP compiler or a quantum computing service compiler. Also, the compiled binary may be used at a QPU of a QHP or a local QPU of the quantum computing service.

Figure 9:
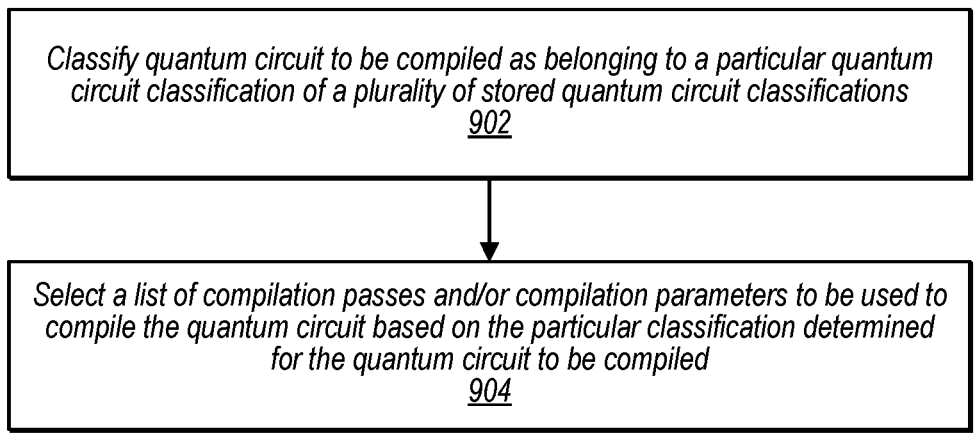
FIG. 9 illustrates an example compilation optimization process that may be used by a quantum circuit compilation pass and/or compilation parameters determination module, according to some embodiments.

FIG. 9 illustrates an example compilation optimization process that may be used by a quantum circuit compilation pass and/or compilation parameters determination module, according to some embodiments. At block 902, a compilation optimization module classifies a quantum circuit to be compiled as belonging to a particular quantum circuit classification of a plurality of stored quantum circuit classifications. At block 904, the compilation optimization module selects a list of compilation passes and/or compilation parameters to be used to compile the quantum circuit based on the particular classification determined for the quantum circuit to be compiled.

Figure 10:
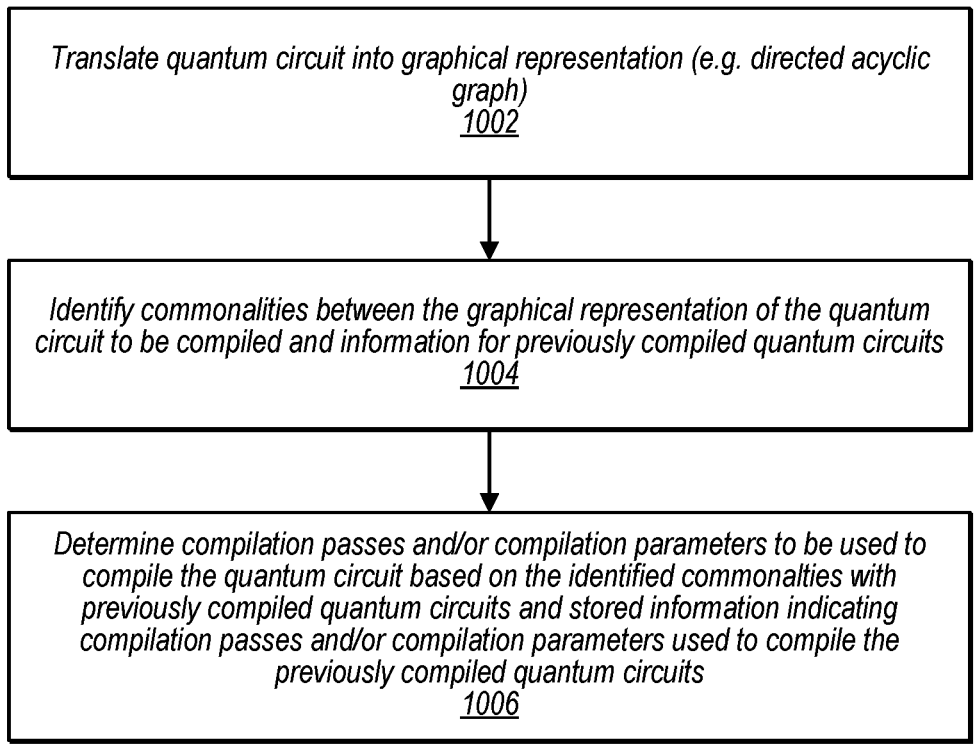
FIG. 10 illustrates another example compilation optimization process that may be used by a quantum circuit compilation pass and/or compilation parameters determination module, according to some embodiments.

FIG. 10 illustrates another example compilation optimization process that may be used by a quantum circuit compilation pass and/or compilation parameters determination module, according to some embodiments. At block 1002, a compilation optimization module translates a quantum circuit into graphical representation (e.g., directed acyclic graph). At block 1004, the compilation optimization module identifies commonalities between the graphical representation of the quantum circuit to be compiled and information for previously compiled quantum circuits. Then, at block 1006, the compilation optimization module determines compilation passes and/or compilation parameters to be used to compile the quantum circuit based on the identified commonalties with previously compiled quantum circuits and stored information indicating compilation passes and/or compilation parameters used to compile the previously compiled quantum circuits.

Figure 11:
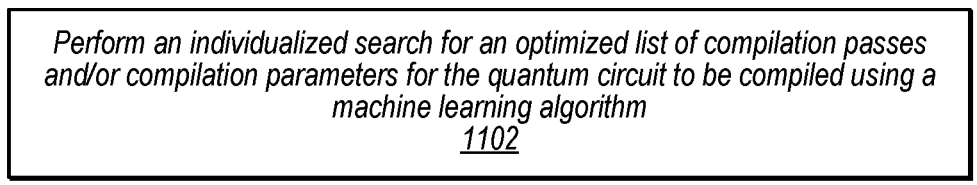
FIG. 11 illustrates yet another example compilation optimization process that may be used by a quantum circuit compilation pass and/or compilation parameters determination module, according to some embodiments.

FIG. 11 illustrates yet another example compilation optimization process that may be used by a quantum circuit compilation pass and/or compilation parameters determination module, according to some embodiments. At block 1102 the compilation optimization module performs an individualized search for an optimized list of compilation passes and/or compilation parameters for the quantum circuit to be compiled using a machine learning algorithm.

In some embodiments a given compilation module, such as compilation module 105, may include multiple types of compilation optimization modules, such as compilation optimization modules 216, 234, and 238, that implement processes as shown in FIGS. 9-11. In some embodiments, different compilation optimization techniques may be used based on different customer requirements for compilation optimization and/or quantum circuit complexity. For example, some customers may require individually optimized compilation as described in FIG. 11, while other customers may desire category-based optimization as described in FIG. 9. In some embodiments, different levels of optimization may require different amounts of time to perform and/or different computing resources to perform. Therefore, some customers may opt-into using a particular type of optimization while other customers may opt-into using a different type of optimization. Though, in some embodiments, the quantum computing service may support multiple optimization types from which a customer may choose.

FIG. 12 illustrates edge computing devices of a quantum computing service physically located at quantum hardware provider locations, according to some embodiments.

In some embodiments, service provider network 100, as illustrated in FIG. 1, may include one or more data centers connected to each other via private or public network connections. Also, edge computing devices located at quantum hardware provider locations may be connected to a service provider network via private or public network connections. For example, service provider network 100 illustrated in FIG. 12 includes data centers 1206*a*, 1206*b*, and 1206*c* that are connected to one another via private physical network links of the service provider network 100. In some embodiments, a customer of the service provider network may also be connected via a private physical network link that is not available to the public to carry network traffic, such as a physical connection at a router co-location facility. For example, customer 1210 is connected to a router associated with data center 1206*c* via direct connection 1224. In a similar manner, edge computing devices located at quantum hardware provider locations may be connected to a service provider network via a private physical network link that is not available to carry public network traffic.

For example, edge computing device 1204*a* located at quantum hardware provider location 1202*a* is connected to a router at data center 1206*a* via direct connection 1218. In a similar manner, edge computing device 1204*b* at quantum hardware provider location 1202*b* is connected to a router at data center 1206*b* via direct connection 1220. Also, edge computing device 1204*c* at quantum hardware provider 1202*c* is connected to a router at data center 1206*c* via direct connection 1222.

Also, in some embodiments an edge computing device of a service provider network located at a quantum hardware provider location may be connected to the service provider network via a logically isolated network connection over a shared network connection, such as via the Internet or another public network. For example, edge computing device 1204*d* at quantum hardware provider location 1202*d* is connected to data center 1206*c* via a logically isolated network connection via network 1216. In a similar manner, in some embodiments a customer, such as customer 1214, may be connected to service provider network 100 via public network 1212.

In some embodiments, a quantum computing service such as quantum computing service 102, may be implemented using one or more computing devices in any of data centers 1206*a*, 1206*b*, 1206*c*, etc. Also, the quantum computing service 102, may provide customers, such as customer 1214 or customer 1210, access to quantum computers in any of quantum hardware provider locations 1202*a*, 1202*b*, 1202*c*, 1202*d*, etc. For example, a customer may not be restricted to using a quantum hardware provider in a local region where the customer is located. Instead, the customer may be allocated compute instances instantiated on a local edge computing device located at a selected quantum hardware provider location, such that the location of the customer does not restrict the customer's access to various types of quantum computing technology-based quantum computers.

In some embodiments, one or more of the data centers 1206 may also include local quantum hardware devices, such as local QPUs 1226.

Example Edge Computing Device Located at a Quantum Hardware Provider Location

Figure 13:
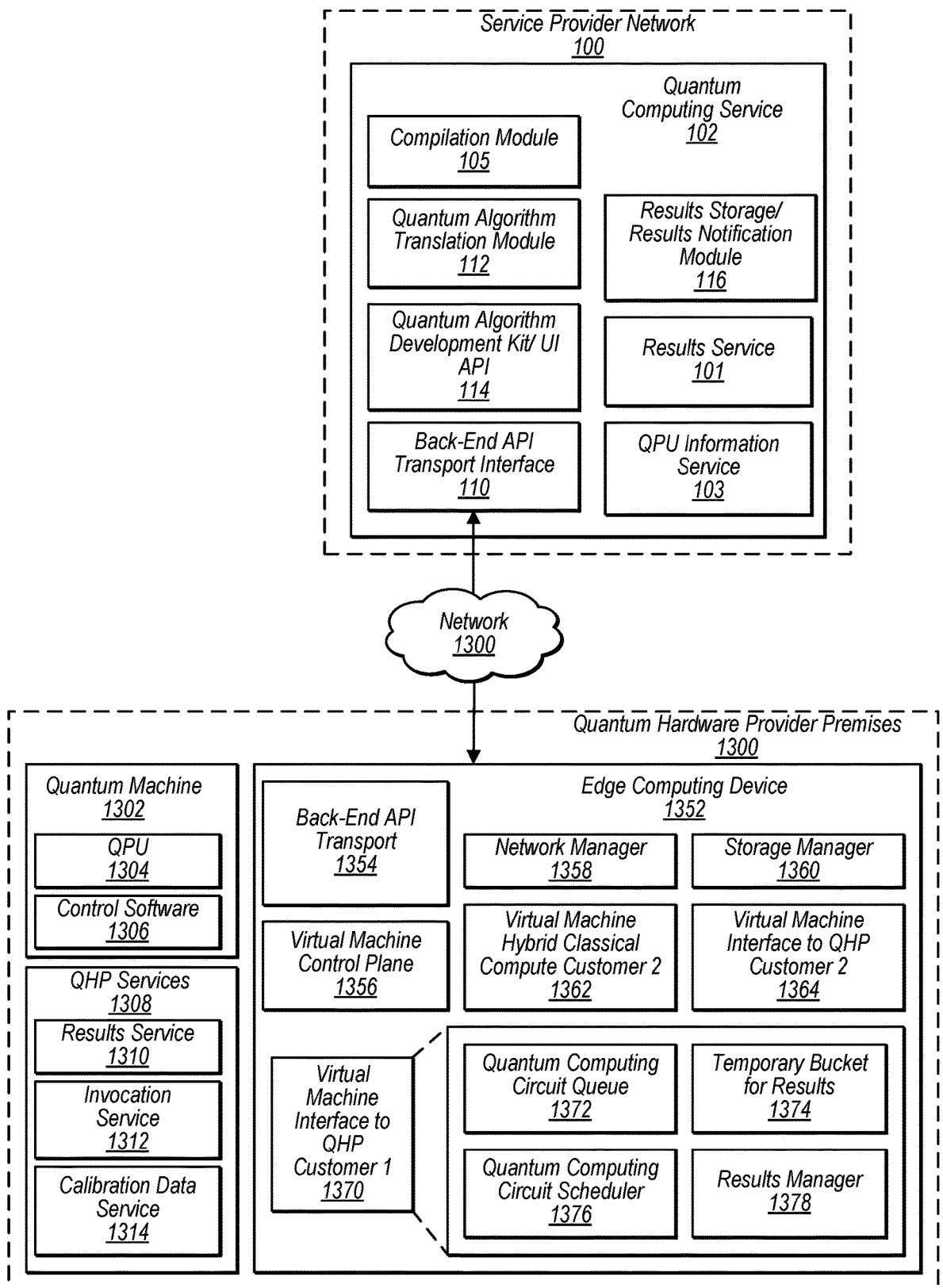
FIG. 13 illustrates an example edge computing device connected to a quantum computing service, according to some embodiments.

FIG. 13 illustrates an example edge computing device connected to a quantum computing service, according to some embodiments.

Service provider network 100 and quantum computing service 102 may be similar to the service provider networks and quantum computing services described herein, such as in FIG. 1. Also, edge computing device 1352 may be a similar edge computing device as any of the edge computing devices described previously, such as in FIG. 1 or 12. Edge computing device 1352 is connected to service provider network 100 via network connection 1300, which may be a logically isolated network connection via a public network, a dedicated physical non-public network link, or other suitable network connection.

Edge computing device 1352 includes network manager 1358, storage manager 1360, and virtual machine control plane 1356.

In some embodiments, a back-end application programmatic interface (API) transport of an edge computing device, such as back-end API transport 1354 of edge computing device 1352 may ping a quantum computing service to determine if there are quantum circuits (e.g., quantum tasks) waiting to be transported to the edge computing device. The edge computing device may further use a non-public back-end API transport, such as back-end API transport 1354 to bring the quantum circuit into the edge computing device 1352.

Additionally, for each customer, a back-end API transport of an edge computing device of a quantum computing service, such as back-end API transport 1354 of edge computing device 1352, may cause a virtual machine to be instantiated to manage scheduling and results for a given quantum circuit pulled into the edge computing device from a back-end API. For example, virtual machine 1370 may act as an interface to the quantum hardware provider for a given customer of the quantum computing service. The edge computing device may be directly connected to a local non-public network at the quantum hardware provider location and may interface with a scheduling component of the quantum hardware provider to schedule availability (e.g., usage slots) on a quantum computer of the quantum hardware provider.

In some embodiments, the virtual machine 1370 may be booted with a particular quantum machine image that supports interfacing with the scheduling component of the quantum hardware provider, wherein different quantum hardware providers require different scheduling interfaces.

In some embodiments, virtual machine 1370 may be booted with a quantum circuit queuing component 1372, a quantum circuit scheduling component 1376, a component that manages a local storage bucket on the edge computing device to temporarily store results, such as temporary bucket 1374 and results manager 1378. In some embodiments, quantum circuit scheduling component 1376 may order quantum circuits in quantum circuit queuing component in the order they are received, wherein the received order enforces QoS guarantees by ordering the quantum tasks in the quantum task queue of the quantum computing service based on priorities determined using the QoS guarantees.

In some embodiments, an edge computing device, such as edge computing device 1352, may support multi-tenancy. Also, in some embodiments, edge computing device 1352 may also instantiate virtual machines that execute classical computing tasks, such as a classical computing portion of a hybrid algorithm. For example, edge computing device 1352 also includes a virtual machine 1362 for another customer that performs classical compute portions of a hybrid algorithm and an additional virtual machine 1364 for the other customer which acts as a quantum hardware provider interface for the other customer.

In some embodiments, a back-end API transport of an edge computing device located a quantum hardware provider location may interface with a back-end API transport interface 110 of a computing device/router at a remote location where one or more computing devices that implement the quantum computing service are located.

Note that edge computing device 1352 may be physically located at quantum hardware provider premises 1350, such as in a building of a quantum hardware provider facility.

In some embodiments, the components of virtual machine 1370 may be included in back-end API transport 1354, and the back-end API transport 1354 may execute the related components within the back-end API transport without causing a separate VM 1370 to be instantiated.

In some embodiments, edge computing device 1352 may interface with QHP services 1308 which may include a results service 1310, an invocation service 1312, and a calibration data service 1314. Also, the QHP services 1308 may interface with a quantum machine 1302, which may include QPU 1304 and control software 1306. In some embodiments, calibration data service 1314 may obtain QPU information about QPU 1304 and provide it to edge computing device 1352, which in turn provides the QPU information to the quantum computing service via back-end API transport 1354, such that the QPU information is added to QPU information of QPU information service 103. In a similar manner, results may be routed from results service 1310 of the QHP service to the results service 101 of the quantum computing service 102. These results and QHP information may be used by compilation module 105 as described above.

Illustrative Computer System

Figure 14:
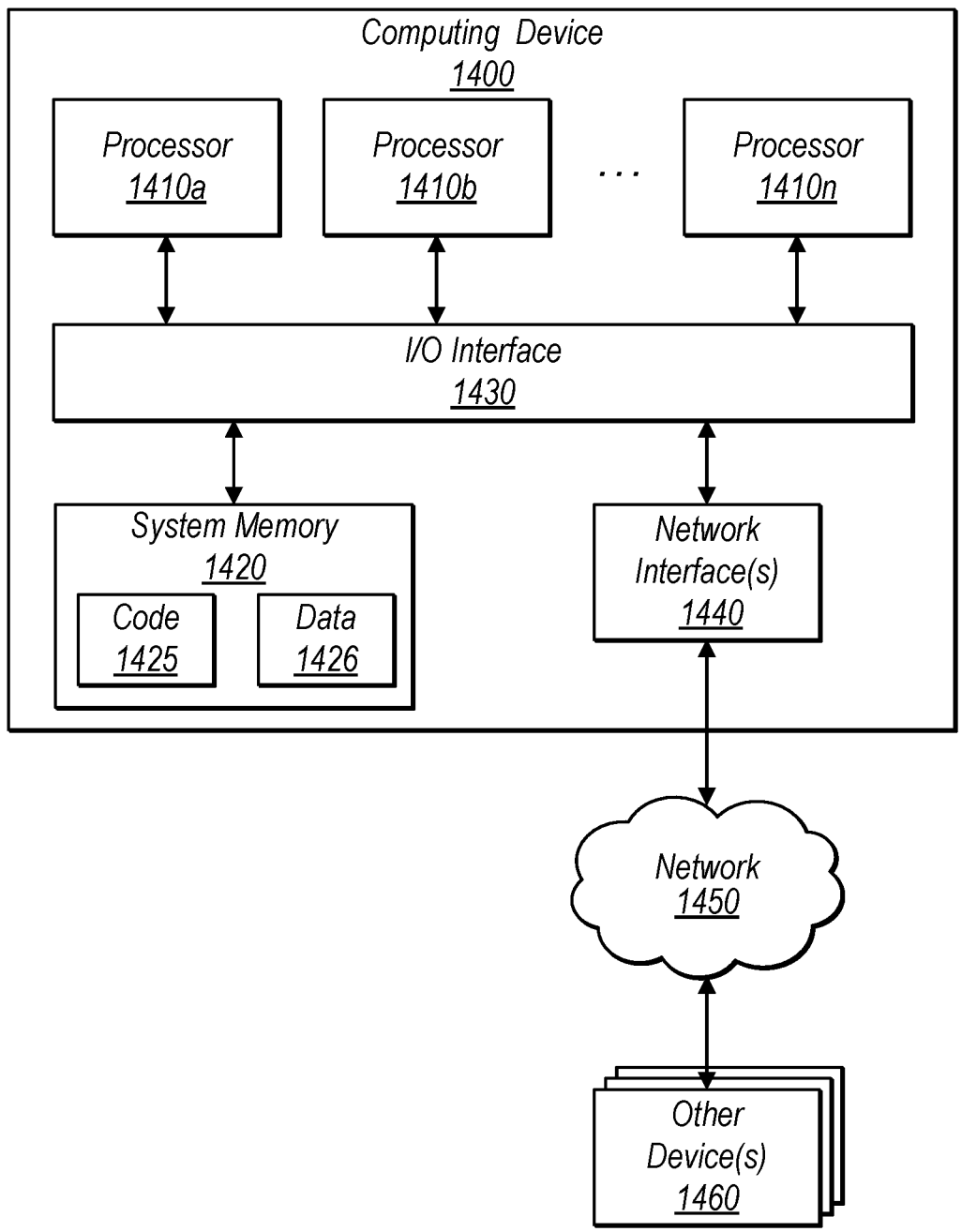
FIG. 14 is a block diagram illustrating an example classical computing device that may be used in at least some embodiments.

FIG. 14 is a block diagram illustrating an example computing device that may be used in at least some embodiments.

FIG. 14 illustrates such a general-purpose computing device 1400 as may be used in any of the embodiments described herein. In the illustrated embodiment, computing device 1400 includes one or more processors 1410 coupled to a system memory 1420 (which may comprise both non-volatile and volatile memory modules) via an input/output (I/O) interface 1430. Computing device 1400 further includes a network interface 1440 coupled to I/O interface 1430.

In various embodiments, computing device 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA. In some implementations, graphics processing units (GPUs) may be used instead of, or in addition to conventional processors.

System memory 1420 may be configured to store instructions and data accessible by processor(s) 1410. In at least some embodiments, the system memory 1420 may comprise both volatile and non-volatile portions; in other embodiments, only volatile memory may be used. In various embodiments, the volatile portion of system memory 1420 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1420 as code 1425 and data 1426.

In some embodiments, I/O interface 1430 may be configured to coordinate I/O traffic between processor 1410, system memory 1420, and any peripheral devices in the device, including network interface 1440 or other peripheral interfaces such as various types of persistent and/or volatile storage devices. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computing device 1400 and other devices 1460 attached to a network or networks 1450, such as other computer systems or devices as illustrated in FIG. 1 through FIG. 13, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks such as Fibre Channel SANs, or via any other suitable type of network and/or protocol.

In some embodiments, system memory 1320 may represent one embodiment of a computer-accessible medium configured to store at least a subset of program instructions and data used for implementing the methods and apparatus discussed in the context of FIG. 1 through FIG. 13. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1400 via I/O interface 1430. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1400 as system memory 1420 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 1440. Portions or all of multiple computing devices such as that illustrated in FIG. 14 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to implement a quantum computing service, wherein the quantum computing service comprises:
a quantum algorithm development kit user interface or an application programmatic interface (API);
a compilation module; and
a back-end transport,
wherein:
to implement the quantum algorithm development kit user interface or the application programmatic interface (API) the one or more computing devices are further configured to receive, from a customer of the quantum computing service, a quantum program comprising one or more quantum circuits to be executed via the quantum computing service;
to implement the compilation module the one or more computing devices are further configured to:
receive a quantum circuit description for a given one of the one or more quantum circuits;
receive information about a quantum processing unit (QPU) to be used to execute the given quantum circuit;
perform, with respect to a compilation optimization metric (M), optimization techniques to determine a list of compilation passes to be used to compile respective compiled versions of the one or more quantum circuits included in the quantum program, wherein the compilation module is configured to determine the list of compilation passes based on:
the quantum circuit description for the given one of the one or more quantum circuits to be compiled;
information associated with previously compiled quantum circuits; and
the information received by the quantum computing service about the quantum processing unit to be used to execute the given quantum circuit to be compiled; and
compile, using the determined list of compilation passes, a QPU specific binary for the given quantum circuit of the quantum program that is to be transported to a quantum hardware provider or a local QPU; and
to implement the back-end transport the one or more computing devices are configured to:
transport the compiled QPU specific binary for the given quantum circuit of the quantum program to the quantum hardware provider; or
transport the compiled QPU specific binary for the given quantum circuit of the quantum program to a local QPU of the quantum computing service, for use in executing the quantum program.

2. The system of claim 1, wherein the determined list of compilation passes comprises two or more passes selected from a set of supported compilation passes comprising:
layout synthesis passes;
mapping passes;
basis change compilation passes; and
quantum circuit optimization passes.

3. The system of claim 1, wherein the determined list of compilation passes, when used to compile the compiled version of the given quantum circuit, results in a compiled version that is:
decomposed in a basis matching a basis of the QPU to be used to execute the given quantum circuit;
mapped to quantum hardware components of the QPU to be used to execute the given quantum circuit; and
optimized with respect to the compilation optimization metric (M).

4. The system of claim 1, wherein the compilation optimization metric (M) is specified by the customer of the quantum computing service that submitted the quantum program comprising the given quantum circuit.

5. The system of claim 1, wherein the compilation optimization metric (M) comprises:
an amount of time required to execute the given quantum circuit or the quantum program;
an amount of QPU resources required to execute the given quantum circuit or the quantum program;
an error rate for the given quantum circuit, when executed using the compiled QPU specific binary compiled using the determined list of compilation passes;
an amount of time required to simulate the given quantum circuit or the quantum program using a classical computing based simulator; or
an amount of classical computing resources required to simulate the given quantum circuit or the quantum program using the classical computing based simulator.

6. The system of claim 1, wherein the one or more computing devices configured to implement the compilation module are further configured to determine the list of compilation passes based on:
dependency constraints, wherein an output of a given compilation pass is required to exist before another one of the compilation passes can be performed; and
existence constraints, wherein outputs of at least some of the compilation passes are required to exist in order to generate the compiled QPU specific binary for the given quantum circuit that is executable on the QPU.

7. The system of claim 1, wherein the one or more computing devices configured to implement the compilation module are further configured to:
determine a set of compilation parameters to be used to compile the compiled version of the given quantum circuit; and
compile the QPU specific binary using the determined list of compilation passes in addition to the set of compilation parameters.

8. The system of claim 7, wherein the set of compilation parameters comprises:
one or more respective flags associated with one or more respective ones of the compilation passes of the list, wherein the respective flags indicate whether a given operation is to be performed in the associated compilation pass associated with the respective flag or delayed to a subsequent compilation pass in the list.

9. The system of claim 1, wherein the compilation module is configured to use a machine learning algorithm to perform said determining the list of compilation passes using the information learned from previously compiled quantum circuits.

10. The system of claim 9, wherein the machine learning algorithm is configured to:
classify the given quantum circuit included in the quantum program as belonging to a particular one of a plurality of stored quantum circuit classifications, and
wherein to determine the list of compilation passes, the compilation module is further configured to:
select a list of compilation passes to be used for the given quantum circuit based on the particular classification to which the given quantum circuit has been classified.

11. The system of claim 9, wherein the one or more computing devices configured to implement the compilation module are further configured to:
translate the one or more quantum circuits included in the quantum program into one or more respective directed acyclic graphs;
wherein the machine learning algorithm comprises a neural network configured to:
identify commonalities in the one or more directed acyclic graphs for the one or more quantum circuits included in the quantum program and other directed acyclic graphs for the previously complied quantum circuits; and
determine the list of compilation passes to be used for the one or more quantum circuits of the quantum program based on the identified commonalities to the previously compiled quantum circuits and respective lists of compiler passes used to compile the previously compiled quantum circuits.

12. A method, comprising:
receiving, from a customer of a quantum computing service, a quantum program comprising one or more quantum circuits to be executed via the quantum computing service;
receiving a quantum circuit description for a given one of the one or more quantum circuits;
receiving information about a quantum processing unit (QPU) to be used to execute the given quantum circuit;
performing, with respect to a compilation optimization metric (M), optimization techniques to determine a list of compilation passes to be used to compile respective compiled versions of the one or more quantum circuits included in the quantum program based on:
the quantum circuit description for the given one of the one or more quantum circuits to be compiled;
information associated with previously compiled quantum circuits; and
the information received by the quantum computing service about the quantum processing unit to be used to execute the given quantum circuit to be compiled; and
compiling, using the determined list of compilation passes, a QPU specific binary for the given quantum circuit of the quantum program.

13. The method of claim 12, wherein the list of compilation passes, when used to compile the compiled version of the given quantum circuit, results in a compiled version that is:
mapped to quantum hardware components of the QPU to be used to execute the given quantum circuit; and
optimized with respect to the compilation optimization metric (M).

14. The method of claim 12, wherein the compilation optimization metric (M) comprises:
an amount of time required to execute the given quantum circuit or the quantum program;
an amount of QPU resources required to execute the given quantum circuit or the quantum program;
an error rate for the given quantum circuit, when executed using the compiled QPU specific binary compiled using the determined list of compilation passes;
an amount of time required to simulate the given quantum circuit or the quantum program using a classical computing based simulator; or
an amount of classical computing resources required to simulate the given quantum circuit or the quantum program using the classical computing based simulator.

15. The method of claim 12, wherein the compilation optimization metric (M) is specified by the customer of the quantum computing service that submitted the quantum program comprising the given quantum circuit.

16. The method of claim 12, wherein said performing, with respect to the compilation optimization metric (M), the optimization techniques to determine the list of compilation passes comprises:
classifying the given quantum circuit included in the quantum program as belonging to a particular one of a plurality of stored quantum circuit classifications; and
selecting a list of compilation passes to be used for the given quantum circuit based on the particular classification to which the given quantum circuit has been classified.

17. The method of claim 12, wherein said performing, with respect to the compilation optimization metric (M), the optimization techniques to determine the list of compilation passes comprises:
translating the one or more quantum circuits included in the quantum program into one or more respective directed acyclic graphs;
identifying commonalities in the one or more directed acyclic graphs for the one or more quantum circuits included in the quantum program and other directed acyclic graphs for previously complied quantum circuits; and
determining the list of compilation passes to be used for the one or more quantum circuits of the quantum program based on the identified commonalities to the previously compiled quantum circuits and respective lists of compilation passes used to compile the previously compiled quantum circuits.

18. One or more non-transitory, computer-readable media storing program instructions, that when executed on or across one or more processors, cause the one or more processors to:
receive a quantum program comprising one or more quantum circuits;
receive a quantum circuit description for a given one of the one or more quantum circuits;
receive information about a quantum processing unit (QPU) to be used to execute the given quantum circuit;
perform, with respect to a compilation optimization metric (M), optimization techniques to determine a list of compilation passes to be used to compile respective compiled versions of the one or more quantum circuits included in the quantum program based on:
the quantum circuit description for the given one of the one or more quantum circuits to be compiled;
information associated with previously compiled quantum circuits; and the information about the quantum processing unit to be used to execute the given quantum circuit to be compiled; and compile, using the determined list of compilation passes, a QPU specific binary for the given quantum circuit of the quantum program.

19. The one or more non-transitory, computer-readable media of claim 18, wherein to perform, with respect to the compilation optimization metric (M), the optimization techniques to determine the list of compilation passes, the program instructions, when executed on or across the one or more processors, cause the one or more processors to:

classify the given quantum circuit included in the quantum program as belonging to a particular one of a plurality of stored quantum circuit classifications; and select a list of compilation passes to be used for the given quantum circuit based on the particular classification to which the given quantum circuit has been classified.

20. The one or more non-transitory, computer-readable media of claim 18, wherein to perform, with respect to the compilation optimization metric (M), the optimization techniques to determine the list of compilation passes, the program instructions, when executed on or across the one or more processors, cause the one or more processors to:

translate the one or more quantum circuits included in the quantum program into one or more respective directed acyclic graphs;

identify commonalities in the one or more directed acyclic graphs for the one or more quantum circuits included in the quantum program and other directed acyclic graphs for previously complied quantum circuits; and determine the list of compilation passes to be used for the one or more quantum circuits of the quantum program based on the identified commonalities to the previously compiled quantum circuits and respective lists of compilation passes used to compile the previously compiled quantum circuits.

* * * * *